United States Patent
Gao et al.

(10) Patent No.: US 11,188,773 B2
(45) Date of Patent: Nov. 30, 2021

(54) SYSTEMS AND METHODS FOR DETECTING REGION OF INTERSET IN IMAGE

(71) Applicant: SHANGHAI UNITED IMAGING INTELLIGENCE CO., LTD., Shanghai (CN)

(72) Inventors: Yaozong Gao, Shanghai (CN); Yanbo Chen, Shanghai (CN); Jiyong Wang, Shanghai (CN); Weiyang Xie, Shanghai (CN); Yiqiang Zhan, Shanghai (CN)

(73) Assignee: SHANGHAI UNITED IMAGING INTELLIGENCE CO., LTD., Shanghai (CN)

( * ) Notice: Subject to any disclaimer, the term of this patent is extended or adjusted under 35 U.S.C. 154(b) by 122 days.

(21) Appl. No.: 16/600,960

(22) Filed: Oct. 14, 2019

(65) Prior Publication Data
US 2020/0167586 A1 May 28, 2020

(30) Foreign Application Priority Data
Nov. 26, 2018 (CN) .......................... 201811417230.2

(51) Int. Cl.
*G06K 9/00* (2006.01)
*G06K 9/32* (2006.01)
(Continued)

(52) U.S. Cl.
CPC ......... *G06K 9/3233* (2013.01); *G06K 9/4628* (2013.01); *G06K 9/66* (2013.01); *G06N 3/0454* (2013.01); *G06N 3/08* (2013.01)

(58) Field of Classification Search
CPC ...... G06K 9/3233; G06K 9/4628; G06K 9/66; G06N 3/0454; G06N 3/08
See application file for complete search history.

(56) References Cited

U.S. PATENT DOCUMENTS 9,589,374 B1* 3/2017 Gao ...................... G06T 11/008
9,668,699 B2 6/2017 Georgescu et al.
(Continued)

FOREIGN PATENT DOCUMENTS

CN 105232081 A 1/2016
CN 106022300 A 10/2016
(Continued)

OTHER PUBLICATIONS

O. Ronneberger et al., U-Net: Convolutional Networks for Biomedical Image Segmentation, Medical Image Computing and Computer-Assisted Intervention, 234-241, 2015.
(Continued)

*Primary Examiner* — Shefali D Goradia
(74) *Attorney, Agent, or Firm* — Metis IP LLC

(57) ABSTRACT

The present disclosure provides a region of interest (ROI) detection system. The system may be configured to acquire a target image and an ROI detection model, and perform ROI detection on the target image by applying the ROI detection model to the target image. The ROI detection model may be a trained cascaded neural network including a plurality of sequentially connected trained models. The plurality of trained models may include a trained first model and at least one trained second model downstream to the trained first model in the trained cascaded neural network. The plurality of trained models may be sequentially trained. Each of the trained second model may be trained using a plurality of training samples determined based on one or more trained models of the plurality of trained models generated before the generation of the trained second model.

20 Claims, 14 Drawing Sheets

(51) Int. Cl.
*G06K 9/46* (2006.01)
*G06K 9/66* (2006.01)
*G06N 3/04* (2006.01)
*G06N 3/08* (2006.01)

(56) References Cited

U.S. PATENT DOCUMENTS

| | | | |
|---|---|---|---|
| 10,296,794 B2* | 5/2019 | Ratti | G06K 9/00785 |
| 10,713,783 B2* | 7/2020 | Nakano | G06T 7/0012 |
| 2015/0347822 A1 | 12/2015 | Zhou et al. | |
| 2017/0124409 A1 | 5/2017 | Choi et al. | |
| 2018/0060723 A1 | 3/2018 | Nakano et al. | |
| 2019/0015059 A1 | 1/2019 | Itu et al. | |

FOREIGN PATENT DOCUMENTS

| | | |
|---|---|---|
| CN | 106504232 A | 3/2017 |
| CN | 107016665 A | 8/2017 |
| CN | 108230323 A | 6/2018 |
| CN | 108615237 A | 10/2018 |
| CN | 108830826 A | 11/2018 |

OTHER PUBLICATIONS

Jia Ding et al., Accurate Pulmonary Nodule Detection in Computed Tomography Images Using Deep Convolutional Neural Networks, 2017, 9 pages.

Shaoqing Ren et al., Faster R-CNN: Towards Real-time Object Detection with Region Proposal Networks, International Conference on Neural Information Processing Systems, 2015, 14 pages.

First Office Action in Chinese Application No. 201811417230.2 dated Sep. 29, 2019, 13 pages.

* cited by examiner

600A

| Determining, based on a plurality of training images, a plurality of first negative samples of a first model and a plurality of positive samples | ∼ 602 |

↓

| Designating the plurality of first negative samples and the plurality of positive samples as training samples of the first model | ∼ 604 |

FIG. 6A

SYSTEMS AND METHODS FOR DETECTING REGION OF INTERSET IN IMAGE

CROSS-REFERENCE TO RELATED APPLICATIONS

This application claims priority to Chinese Patent Application No. 201811417230.2, filed on Nov. 26, 2018, the content of which is hereby incorporated by reference.

TECHNICAL FIELD

The present disclosure generally relates to image processing, and more particularly, relates to systems and methods for detecting a region of interest (ROI) in an image using a machine learning technique.

BACKGROUND

Computer-aided detection (CAD) techniques are widely used in ROI detection in various areas, such as medical imaging and diagnostic radiology. For example, the CAD technique is often used to detect a suspicious lesion from a medical image to provide a basis for medical diagnosis and/or treatment. Recently, machine learning has promoted the development of CAD technology. For example, an ROI detection model may be trained using a machine learning technique and applied to a target image to automatically detect one or more ROIs in the target image. At present, an ROI detection model is usually designed for detecting a particular type of ROI (e.g., a pulmonary nodule) and/or an ROI having a particular size, which may have limited accuracy and/or efficiency in ROI detection. Therefore, it is desirable to provide effective systems and methods for generating an ROI detection model and for using the ROI detection model to detect an ROI in a target image.

SUMMARY

According to one aspect of the present disclosure, an ROI detection system is provided. The system may include at least one storage medium storing a set of instructions, and at least one processor in communication with the at least one storage medium. When executing the instructions, the at least one processor may be configured to direct the system to perform the following operations. The at least one processor may be configured to direct the system to acquire a target image and an ROI detection model. The at least one processor may be configured to direct the system to perform ROI detection on the target image by applying the ROI detection model to the target image. The ROI detection model may be a trained cascaded neural network including a plurality of sequentially connected trained models. The plurality of trained models may include a trained first model and at least one trained second model downstream to the trained first model in the trained cascaded neural network. The plurality of trained models may be sequentially trained. Each of the trained second model may be trained using a plurality of training samples determined based on one or more trained models of the plurality of trained models generated before the generation of the trained second model.

In some embodiments, each of the plurality of trained models may be configured to generate an output in response to an input of the trained model. The input to the trained first model may include the target image. The input to each of the at least one trained second model may include an output of a previous trained model connected to the trained second model. To perform an ROI detection on the target image by applying the ROI detection model to the target image, the at least one processor may be further configured to direct the system to obtain an output of a last trained model of the plurality of trained models. The at least one processor may be configured to direct the system to determine one or more ROIs in the target image based on the output of the last trained model.

In some embodiments, each of the plurality of trained models may be configured to generate an output in response to an input of the trained model. The input to each trained model may include the target image. To perform an ROI detection on the target image by applying the ROI detection model to the target image, the at least one processor may be further configured to direct the system to obtain an output of each of the plurality of trained models, and determine one or more ROIs in the target image based on the outputs of the plurality of trained models.

In some embodiments, the target image may include a plurality of target pixels. The output of each trained model may include a first preliminary probability map. The first preliminary probability map may include a plurality of first preliminary probability values of the plurality of target pixels. Each of the plurality of first preliminary probability values may be indicative of a preliminary probability that a corresponding target pixel belongs to an ROI of the target image. To determine one or more ROIs in the target image based on the outputs of the plurality of trained models, the at least one processor may be also configured to direct the system to determine a first target probability map including a plurality of first target probability values of the plurality of target pixels based on the first preliminary probability maps. Each of the plurality of first target probability values may be indicative of a target probability that a corresponding target pixel belongs to an ROI of the target image. The at least one processor may be further configured to direct the system to determine the one or more ROIs of the target image based on the first target probability map.

In some embodiments, the target image may include a plurality of target pixels. Each of the target pixels may have a plurality of target anchor boxes, each of the target anchor boxes enclosing the target pixel and representing a candidate ROI enclosing the target pixel. The output of each trained model may include a second preliminary probability map and a target regression map. The second preliminary probability map may include a plurality of second preliminary probability values of the plurality of target anchor boxes. Each second preliminary probability value of a target anchor box may be indicative of a preliminary probability that a corresponding candidate ROI is an ROI of the target image. The target regression map may include least one target location parameter of at least one of the plurality of target anchor boxes. Each target location parameter of a target anchor box may be indicative of a position or a size of the target anchor box relative to an ROI of the target image. To determine one or more ROIs in the target image based on the outputs of the plurality of trained models, the at least one processor may be also configured to direct the system to determine a second target probability map including a plurality of second target probability values of the plurality of target anchor boxes based on the second preliminary probability maps of the plurality of trained models. Each second target probability value of a target anchor box may be indicative of a target probability that a corresponding candidate ROI is an ROI of the target image. The at least one processor may be further configured to direct the system to determine a plurality of preliminary ROIs of the target image based on the target regression map of a last trained model of the plurality of trained models and the second target probability map, and determine the one or more ROIs of the target image based on the plurality of preliminary ROIs.

In some embodiments, the at least one processor may be further configured to direct the system to determine the one or more ROIs of the target image by performing a non-maximum suppressing on the plurality of preliminary ROIs.

In some embodiments, at least one trained model of the plurality of trained models may include a multi-scale trained model configured to perform ROI detection at a plurality of resolution levels.

In some embodiments, the multi-scale trained model may include a plurality of sequentially connected layers each of which corresponds to one of the plurality of resolution levels. The plurality of layers may include a first layer, a last layer, and one or more middle layers between the first layer and the last layer. At least one layer of the plurality of layers other than the last layer may be connected to a next layer via a downsampling path. At least one layer of the plurality of layers other than the first layer may be connected to a previous layer via an upsampling path.

According to another aspect of the present disclosure, a system for generating an ROI detection model is provided. The system may include at least one storage medium storing a set of instructions, and at least one processor in communication with the at least one storage medium. When executing the instructions, the at least one processor may be configured to direct the system to perform the following operations. The at least one processor may be configured to direct the system to acquire a plurality of training images. Each of the plurality of training images may be annotated with one or more ROIs. The at least one processor may be configured to direct the system to generate an ROI detection model by training a cascaded neural network using the plurality of training images. The cascaded neural network may include a plurality of sequentially connected models. The plurality of models may include a first model and at least one second model downstream to the first model in the cascaded neural network. The training the cascaded neural network may include sequentially training the plurality of models. The training each of the plurality of models may include determine a plurality of training samples of the model based at least in part on the plurality of training images, and generating a trained model by training the model using the plurality of training samples of the model. The plurality of training samples of each of the at least one second model may be determined further based on one or more trained models generated before the training of the second model.

In some embodiments, the determining a plurality of training samples of the first model may include determining a plurality of first negative samples of the first model and a plurality of positive samples based on the plurality of training images. Each of the plurality of first negative samples may be indicative of at least a portion of a non-ROI in the plurality of training images. Each of the plurality of positive samples may be indicative of at least a portion of the ROIs in the plurality of training images. The determining a plurality of training samples of the first model may also include designating the plurality of first negative samples and the plurality of positive samples as the training samples of the first model.

In some embodiments, the determining a plurality of first negative samples of the first model and a plurality of positive samples may include designating a plurality of pixels in the ROIs as the plurality of positive samples, and designating a plurality of pixels outside the ROIs as the plurality of first negative samples.

In some embodiments, the determining a plurality of first negative samples of the first model and a plurality of positive samples may include for each of a plurality of pixels in the plurality of training images, defining one or more anchor boxes enclosing the pixel, each of the one or more anchor boxes representing a candidate ROI enclosing the pixel. The determining a plurality of first negative samples of the first model and a plurality of positive samples may include comparing the anchor boxes with the ROIs of the plurality of training images to generate a comparison result. The determining a plurality of first negative samples of the first model and a plurality of positive samples may also include determining the plurality of first negative samples and the plurality of positive samples among the anchor boxes based on the comparison result.

In some embodiments, a ratio of a count of the plurality of positive samples to a count of the plurality of first negative samples may be equal to or greater than a threshold ratio. The threshold ratio may be substantially equal to 0.2.

In some embodiments, for each of the at least one second model, the determining the training samples for each of the at least one second model may include determining a plurality of predicted positive samples representing a plurality of predicted ROIs in the plurality of training images by applying the one or more trained models generated before the training of the second model to the plurality of training images. The determining the training samples for each of the at least one second model may include identifying one or more false positive samples among the plurality of predicted positive samples, and determining a plurality of second negative samples of the second model. The plurality of second negative samples may include at least a portion of the one or more false positive samples. The determining the training samples for each of the at least one second model may further include designating the plurality of second negative samples and the plurality of positive samples as the training samples of the second model.

In some embodiments, for each of the at least one second model, the training each of the plurality of models may further include determining whether a termination condition is satisfied. The training each of the plurality of models may further include, upon a determination that the termination condition is satisfied, designating a trained cascaded neural network as the ROI detection model. The trained cascaded neural network may include the trained second model and the one or more trained models generated before the training of the second model.

In some embodiments, at least one model of the plurality of models may include a multi-scale model configured to perform ROI detection at a plurality of resolution levels.

In some embodiments, the multi-scale model may include a plurality of sequentially connected layers. The plurality of layers may include a first layer, a last layer, and one or more middle layers between the first layer and the last layer. At least one layer of the plurality of layers other than the last layer may be connected to a next layer via a downsampling path. At least one layer of the plurality of layers other than the first layer may be connected to a previous layer via an upsampling path.

In some embodiments, at least one of the one or more middle layers may include a first block, a second block, and a connection component connecting the first block and the second block.

In some embodiments, the ROI detection model may be configured to perform lesion detection on a target image.

According to still another aspect of the present disclosure, a non-transitory computer-readable storage medium including instructions is provided. When executed by at least one processor of an ROI detection system, the instructions causes the system to perform a method. The method may include acquiring a target image and an ROI detection model, and performing ROI detection on the target image by applying the ROI detection model to the target image. The ROI detection model may be a trained cascaded neural network including a plurality of sequentially connected trained models. The plurality of trained models may include a trained first model and at least one trained second model downstream to the trained first model in the trained cascaded neural network. The plurality of trained models may be sequentially trained. Each of the trained second model may be trained using a plurality of training samples determined based on one or more trained models of the plurality of trained models generated before the generation of the trained second model.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 6A is a flowchart illustrating an exemplary process for determining a plurality of training samples of a first model of a cascaded neural network according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Figure 2:
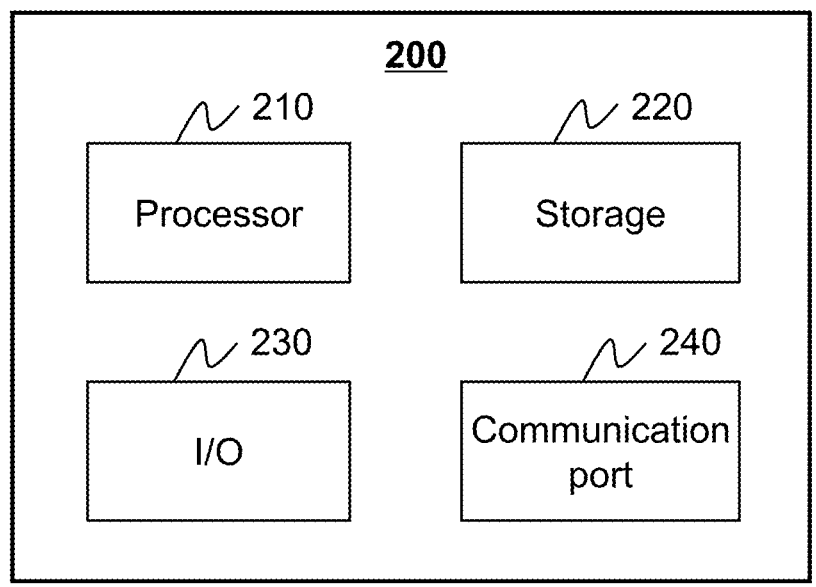
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "image" in the present disclosure is used to collectively refer to image data (e.g., scan data, projection data) and/or images of various forms, including a two-dimensional (2D) image, a three-dimensional (3D) image, a four-dimensional (4D), etc. The term "pixel" and "voxel" in the present disclosure are used interchangeably to refer to an element of an image.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and methods for non-invasive biomedical imaging, such as for disease diagnostic or research purposes. In some embodiments, the systems may include a single modality imaging system and/or a multi-modality imaging system. The single modality imaging system may include, for example, an ultrasound imaging system, an X-ray imaging system, an computed tomography (CT) system, a magnetic resonance imaging (MRI) system, an ultrasonography system, a positron emission tomography (PET) system, an optical coherence tomography (OCT) imaging system, an ultrasound (US) imaging system, an intravascular ultrasound (IVUS) imaging system, a near infrared spectroscopy (NIRS) imaging system, or the like, or any combination thereof. The multi-modality imaging system may include, for example, an X-ray imaging-magnetic resonance imaging (X-ray-MRI) system, a positron emission tomography-X-ray imaging (PET-X-ray) system, a single photon emission computed tomography-magnetic resonance imaging (SPECT-MRI) system, a positron emission tomography-computed tomography (PET-CT) system, a C-arm system, a digital subtraction angiography-magnetic resonance imaging (DSA-MRI) system, etc. It should be noted that the imaging system described below is merely provided for illustration purposes, and not intended to limit the scope of the present disclosure.

The term "imaging modality" or "modality" as used herein broadly refers to an imaging method or technology that gathers, generates, processes, and/or analyzes imaging information of an object. The object may include a biological object and/or a non-biological object. The biological object may be a human being, an animal, a plant, or a portion thereof (e.g., a cell, a tissue, an organ, etc.). In some embodiments, the object may be a man-made composition of organic and/or inorganic matters that are with or without life.

Moreover, while the systems and methods disclosed in the present disclosure are described primarily regarding determining an ROI in an image in a medical imaging system. It should be understood that this is only one exemplary embodiment. The systems and methods of the present disclosure may be applied to any other kind of systems. For example, the systems and methods of the present disclosure may be applied to detect ROIs in images acquired in different scenarios and/or for different purposes (e.g., safety monitoring, filming, or photography) and/or by different image acquisition devices (e.g., a digital camera, an analog camera, or a scanner).

An aspect of the present disclosure relates to systems and methods for generating an ROI detection model. The systems and methods may acquire a plurality of training images, each training image being annotated with one or more ROIs. The systems and methods may also generate an ROI detection model by training a cascaded neural network using the training images. The cascaded neural network may include a plurality of sequentially connected models. The models may be sequentially trained in the training of the cascaded neural network. For each model, the systems and methods may determine a plurality of training samples of the model, and train the model using the corresponding training samples.

According to some embodiments of the present disclosure, the training samples of a specific model of a series of models (e.g., a plurality of second models described elsewhere in the present disclosure) may be determined based on the one or more trained models generated before the training of the specific model. For example, the training samples of a specific model may include one or more false positive samples predicted by the trained model(s) generated before the training of the specific model. In this way, the trained specific model may learn one or more features of the false positive samples and have a higher accuracy in distinguishing a non-ROI from an ROI than the model(s) trained using training samples that do not include any false positive sample, which in turn may improve the accuracy of the ROI detection model. In addition, in some embodiments, the performance of the ROI detection model may be further improved by incorporating one or more multi-scale trained models configured to perform ROI detection at a plurality of resolution levels, so that the ROI detection model may be applied to detect ROIs of various sizes.

Figure 1:
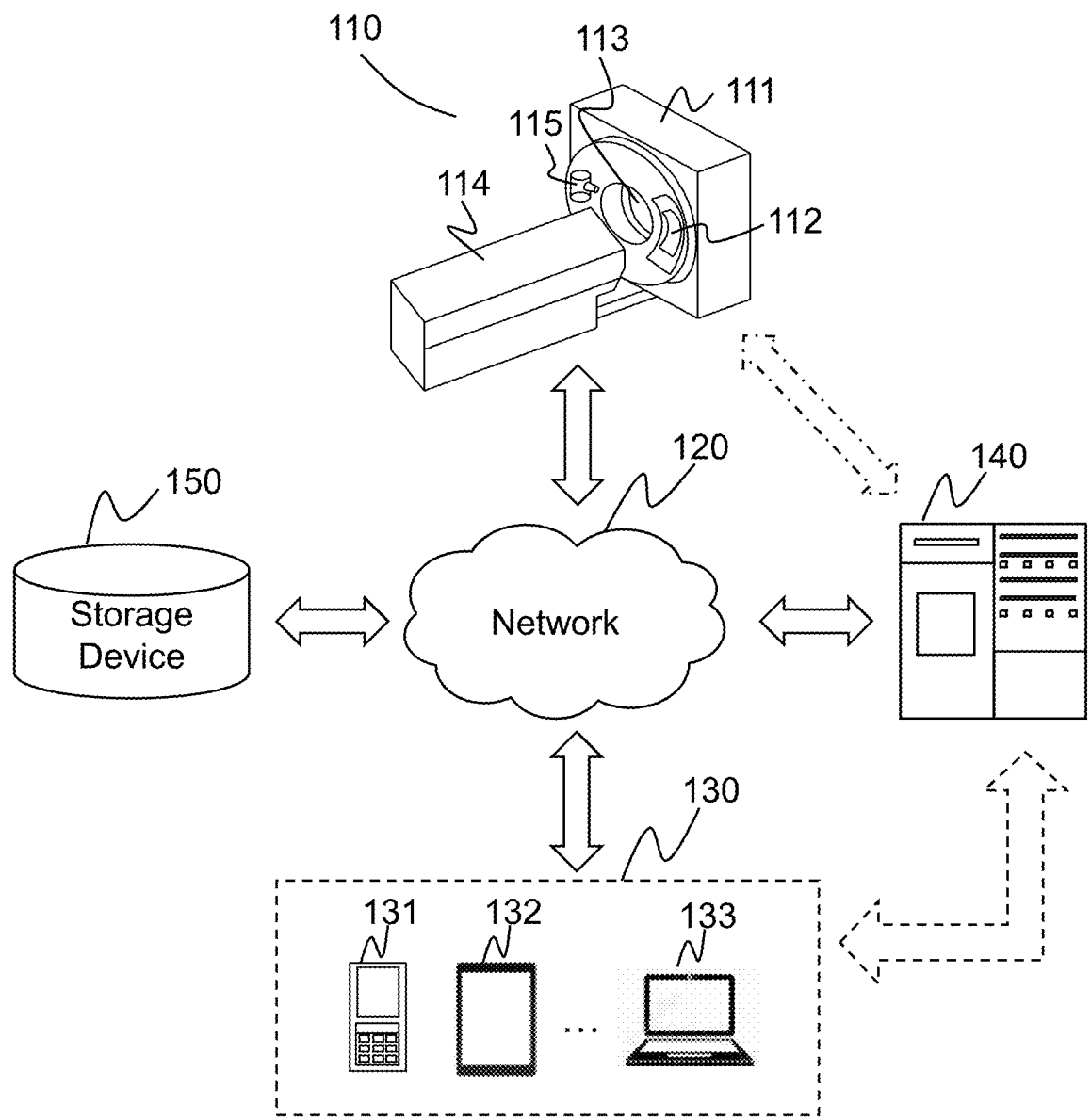
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure. As shown, the imaging system 100 may include an imaging device 110, a network 120, one or more terminals 130, a processing device 140, and a storage device 150. In some embodiments, the imaging device 110, the terminal(s) 130, the processing device 140, and/or the storage device 150 may be connected to and/or communicate with each other via a wireless connection (e.g., the network 120), a wired connection, or a combination thereof. The connection between the components of the imaging system 100 may be variable. Merely by way of example, the imaging device 110 may be connected to the processing device 140 through the network 120, as illustrated in FIG. 1. As another example, the imaging device 110 may be connected to the processing device 140 directly. As a further example, the storage device 150 may be connected to the processing device 140 through the network 120, as illustrated in FIG. 1, or connected to the processing device 140 directly. As still a further example, a terminal 130 may be connected to the processing device 140 through the network 120, as illustrated in FIG. 1, or connected to the processing device 140 directly.

The imaging device 110 may generate or provide image data related to an object via scanning the object. In some embodiments, the object may include a biological object and/or a non-biological object. For example, the object may include a specific portion of a body, such as a head, a thorax, an abdomen, or the like, or a combination thereof. In some embodiments, the imaging device 110 may include a single-modality scanner (e.g., a CT scanner) and/or multi-modality scanner (e.g., a PET-CT scanner) as described elsewhere in this disclosure. In some embodiments, the image data relating to the object may include projection data, one or more images of the object, etc. The projection data may include raw data generated by the imaging device 110 by scanning the object and/or data generated by a forward projection on an image of the object.

In some embodiments, the imaging device 110 may include a gantry 111, a detector 112, a detecting region 113, a scanning table 114, and a radioactive scanning source 115. The gantry 111 may support the detector 112 and the radioactive scanning source 115. The object may be placed on the scanning table 114 to be scanned. The radioactive scanning source 115 may emit radioactive rays to the object. The radiation may include a particle ray, a photon ray, or the like, or a combination thereof. In some embodiments, the radiation may include a plurality of radiation particles (e.g., neutrons, protons, electron, p-mesons, heavy ions), a plurality of radiation photons (e.g., X-ray, a g-ray, ultraviolet, laser), or the like, or a combination thereof. The detector 112 may detect radiations and/or radiation events (e.g., gamma photons) emitted from the detecting region 113. In some embodiments, the detector 112 may include a plurality of detector units. The detector units may include a scintillation detector (e.g., a cesium iodide detector) or a gas detector. The detector unit may be a single-row detector or a multi-rows detector.

The network 120 may include any suitable network that can facilitate the exchange of information and/or data for the imaging system 100. In some embodiments, one or more components of the imaging system 100 (e.g., the imaging device 110, the processing device 140, the storage device 150, the terminal(s) 130) may communicate information and/or data with one or more other components of the imaging system 100 via the network 120. For example, the processing device 140 may obtain image data from the imaging device 110 via the network 120. As another example, the processing device 140 may obtain user instruction(s) from the terminal(s) 130 via the network 120.

The network 120 may be or include a public network (e.g., the Internet), a private network (e.g., a local area network (LAN)), a wired network, a wireless network (e.g., an 802.11 network, a Wi-Fi network), a frame relay network, a virtual private network (VPN), a satellite network, a telephone network, routers, hubs, switches, server computers, and/or any combination thereof. For example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The terminal(s) 130 may be connected to and/or communicate with the imaging device 110, the processing device 140, and/or the storage device 150. For example, the terminal(s) 130 may display an image annotated with one or more ROIs, wherein the ROI(s) in the image may be detected automatically by an ROI detection model. In some embodiments, the terminal(s) 130 may include a mobile device 131, a tablet computer 132, a laptop computer 133, or the like, or any combination thereof. For example, the mobile device 131 may include a mobile phone, a personal digital assistant (PDA), a gaming device, a navigation device, a point of sale (POS) device, a laptop, a tablet computer, a desktop, or the like, or any combination thereof. In some embodiments, the terminal(s) 130 may include an input device, an output device, etc. In some embodiments, the terminal(s) 130 may be part of the processing device 140.

The processing device 140 may process data and/or information obtained from the imaging device 110, the storage device 150, the terminal(s) 130, or other components of the imaging system 100. In some embodiments, the processing device 140 may be a single server or a server group. The server group may be centralized or distributed. For example, the processing device 140 may process a plurality of training images to select a plurality of training samples for training an ROI detection model. The processing device 140 may further generate the ROI detection model by training a model using the training samples. As another example, the processing device 140 may apply the ROI detection model to a target image to perform ROI detection in the target image. In some embodiments, the training samples and/or the ROI detection model may be generated by a processing device, while the application of the ROI detection model may be performed on a different processing device. In some embodiments, the training samples and/or the ROI detection model may be generated by a processing device of a system different than the imaging system 100 or a server different than the processing device 140 on which the application of ROI detection model is performed. For instance, the training samples and/or the ROI detection model may be generated by a first system of a vendor who provides and/or maintains such an ROI detection model, while ROI detection on a target image based on the provided ROI detection model may be performed on a second system of a client of the vendor. In some embodiments, the application of the ROI detection model may be performed online in response to a request for ROI detection in a target image. In some embodiments, the training samples and/or the ROI detection model may be determined or generated offline.

In some embodiments, the processing device 140 may be local to or remote from the imaging system 100. For example, the processing device 140 may access information and/or data from the imaging device 110, the storage device 150, and/or the terminal(s) 130 via the network 120. As another example, the processing device 140 may be directly connected to the imaging device 110, the terminal(s) 130, and/or the storage device 150 to access information and/or data. In some embodiments, the processing device 140 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 140 may be implemented by a computing device 200 having one or more components as described in connection with FIG. 2.

In some embodiments, the processing device 140 may include one or more processors (e.g., single-core processor(s) or multi-core processor(s)). Merely by way of example, the processing device 140 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The storage device 150 may store data, instructions, and/or any other information. In some embodiments, the storage device 150 may store data obtained from the processing device 140, the terminal(s) 130, and/or the imaging device 110. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform as described elsewhere in the disclosure.

In some embodiments, the storage device 150 may be connected to the network 120 to communicate with one or more other components of the imaging system 100 (e.g., the processing device 140, the terminal(s) 130). One or more components of the imaging system 100 may access the data or instructions stored in the storage device 150 via the network 120. In some embodiments, the storage device 150 may be part of the processing device 140.

It should be noted that the above description of the imaging system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the imaging system 100 may include one or more additional components. Additionally or alternatively, one or more components of the imaging system 100 described above may be omitted. As another example, two or more components of the imaging system 100 may be integrated into a single component.

FIG. 2 is a schematic diagram illustrating exemplary hardware and/or software components of a computing device 200 according to some embodiments of the present disclosure. The computing device 200 may be used to implement any component of the imaging system 100 as described herein. For example, the processing device 140 and/or the terminal 130 may be implemented on the computing device 200, respectively, via its hardware, software program, firmware, or a combination thereof. Although only one such computing device is shown, for convenience, the computer functions relating to the imaging system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor 210 may process image data obtained from the imaging device 110, the terminal(s) 130, the storage device 150, and/or any other component of the imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the imaging device 110, the terminal(s) 130, the storage device 150, and/or any other component of the imaging system 100. In some embodiments, the storage 220 may include a mass storage device, a removable storage device, a volatile read-and-write memory, a read-only memory (ROM), or the like, or any combination thereof. In some embodiments, the storage 220 may store one or more programs and/or instructions to perform exemplary methods described in the present disclosure. For example, the storage 220 may store a program for the processing device 140 to execute to generate an ROI detection model.

The I/O 230 may input and/or output signals, data, information, etc. In some embodiments, the I/O 230 may enable a user interaction with the processing device 140. In some embodiments, the I/O 230 may include an input device and an output device. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to another component (e.g., the processing device 140) via, for example, a bus, for further processing. Other types of the input device may include a cursor control device, such as a mouse, a trackball, or cursor direction keys, etc. The output device may include a display (e.g., a liquid crystal display (LCD), a light-emitting diode (LED)-based display, a flat panel display, a curved screen, a television device, a cathode ray tube (CRT), a touch screen), a speaker, a printer, or the like, or a combination thereof.

The communication port 240 may be connected to a network (e.g., the network 120) to facilitate data communications. The communication port 240 may establish connections between the processing device 140 and the imaging device 110, the terminal(s) 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
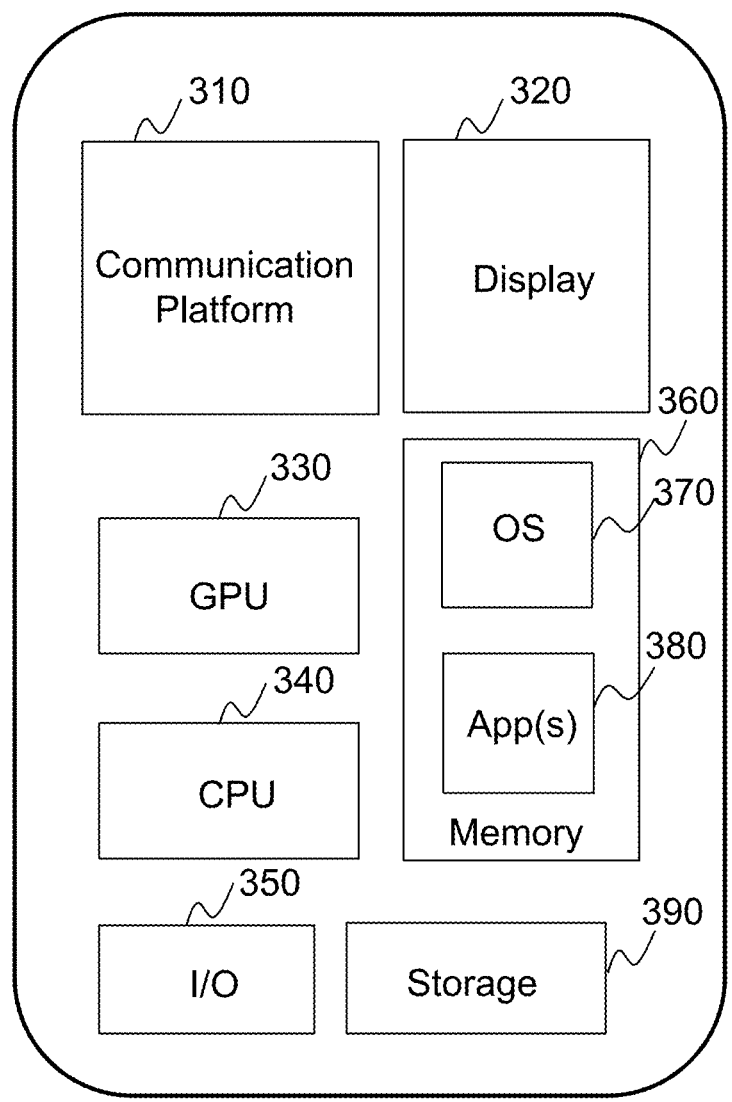
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, one or more components (e.g., a terminal 130 and/or the processing device 140) of the imaging system 100 may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4A:
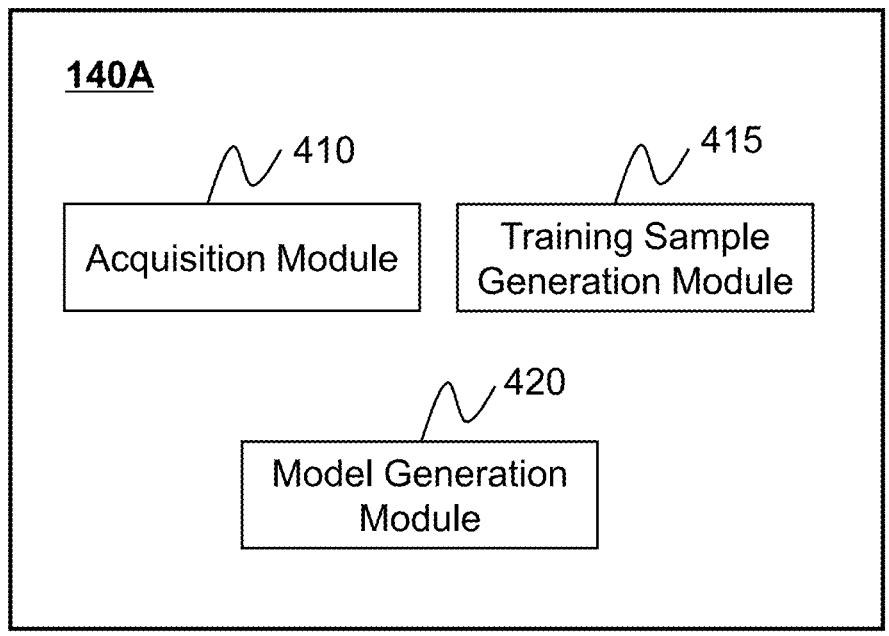
FIGS. 4A and 4B are block diagrams illustrating exemplary processing devices according to some embodiments of the present disclosure.
Figure 4B:
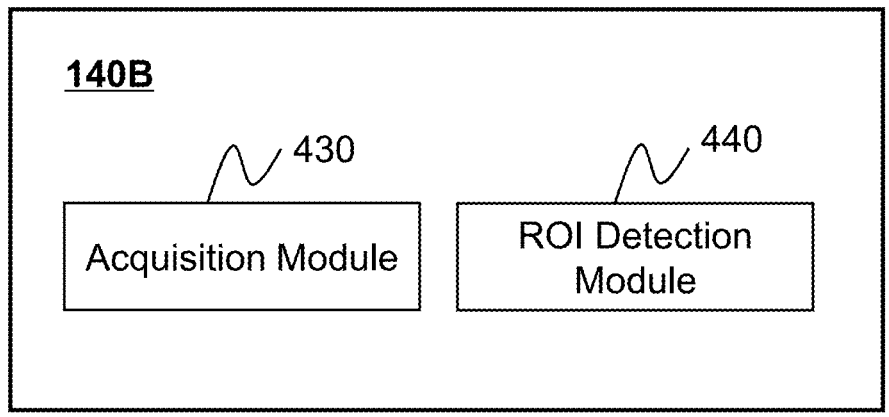

FIGS. 4A and 4B are block diagrams illustrating exemplary processing devices 140A and 140B according to some embodiments of the present disclosure. The processing devices 140A and 140B may be exemplary processing devices 140B as described in connection with FIG. 1. In some embodiments, the processing device 140A may be configured to process information and/or data to determine a set of training samples. The processing device 140A may be further configured to generate an ROI detection model using the set of training samples. The processing device 140B may be configured to identify one or more ROI(s) in a target image by applying the ROI detection model to the target image. In some embodiments, the processing devices 140A and 140B may be respectively implemented on a processing unit (e.g., a processor 210 illustrated in FIG. 2 or a CPU 340 as illustrated in FIG. 3). Merely by way of example, the processing devices 140A may be implemented on a computing device 200, and the processing device 140B may be implemented on a CPU 340 of a terminal device. Alternatively, the processing devices 140A and 140B may be implemented on a same computing device 200 or a same CPU 340. For example, the processing devices 140A and 140B may be implemented on a same computing device 200.

As shown in FIG. 4A, the processing device 140A may include an acquisition module 410, a training sample generation module 415, and a model generation module 420.

The acquisition module 410 may be configured to acquire information relating to the training of the ROI detection model, such as a plurality of training samples and/or a plurality of training images. In some embodiments, the acquisition module 410 may acquire a plurality of training images. Each of the plurality of training images may be annotated with one or more ROIs. The training image may refer to an image of a sample object that has one or more known ROIs (which are annotated in the training image). The ROI(s) in the training image may be annotated in any suitable manner (e.g., by assigning a marker or a label to each pixel of the training image, or by marking a ground truth bounding box). More descriptions regarding the training image and the ROI(s) may be found elsewhere in the present disclosure. See, e.g., operation 502 and relevant descriptions thereof.

The training sample generation module 415 may be configured to determine a plurality of training samples for training the ROI detection model based at least in part on the plurality of training images. For example, the ROI detection model may be generated by training a cascaded neural network that includes a plurality of models. The plurality of models may include a first model and at least one second model downstream to the first model in the cascaded neural network. The training sample generation module 415 may be configured to determine a plurality of training samples for the first model and a plurality of training samples for each of the second model. More descriptions regarding the generation of the training samples may be found elsewhere in the present disclosure. See, e.g., FIGS. 6A and 6B and relevant descriptions thereof.

The model generation module 420 may be configured to generate the ROI detection model based on the training samples. For example, the model generation may train a cascaded neural network using the plurality of training images. The cascaded neural network may include a plurality of sequentially connected models. In some embodiments, at least one model of the cascaded neural network may include a multi-scale model configured to perform ROI detection at a plurality of resolution levels. In some embodiments, the plurality of sequentially connected models may be sequentially trained in the training of the cascaded neural network. More descriptions regarding the generation of the ROI detection model may be found elsewhere in the present disclosure. See, e.g., operation 504 and FIG. 7 and relevant descriptions thereof.

As shown in FIG. 4B, the processing device 140B may include an acquisition module 430 and an ROI detection module 440.

The acquisition module 430 may be configured to acquire information relating to the application of the ROI detection model. For example, the acquisition module 430 may acquire a target image whose ROI is to be detected and the ROI detection model. More descriptions regarding acquisition of the target image and the ROI detection model may be found elsewhere in the present disclosure. See, e.g., operation 802 and relevant descriptions thereof.

The ROI detection module 440 may be configured to perform ROI detection on the target image by applying the ROI detection model to the target image. In some embodiments, a plurality of trained models of the ROI detection model may be configured to perform ROI detection on the target image independently in a parallel manner or sequentially in a serial manner. In some embodiments, the ROI detection result may include one or more detected ROIs in the target image. The ROI detection result may be outputted by the ROI detection model directly. Alternatively, the ROI detection result may be determined by the ROI detection module 440 based on an output of the ROI detection model. More descriptions regarding performing ROI detection on the target may be found elsewhere in the present disclosure. See, e.g., operation 804 and relevant descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140A and/or the processing device 140B may share two or more of the modules, and any one of the modules may be divided into two or more units. For instance, the processing devices 140A and 140B may share a same acquisition module; that is, the acquisition module 410 and the acquisition module 430 are a same module. In some embodiments, the processing device 140A and/or the processing device 140B may include one or more additional modules, such a storage module (not shown) for storing data. In some embodiments, the processing device 140A and the processing device 140B may be integrated into one processing device 140. In some embodiments, the determination of the set of training samples may be performed by a processing device, while the generation of the ROI detection model using the set of training samples may be performed by another processing device.

Figure 5:
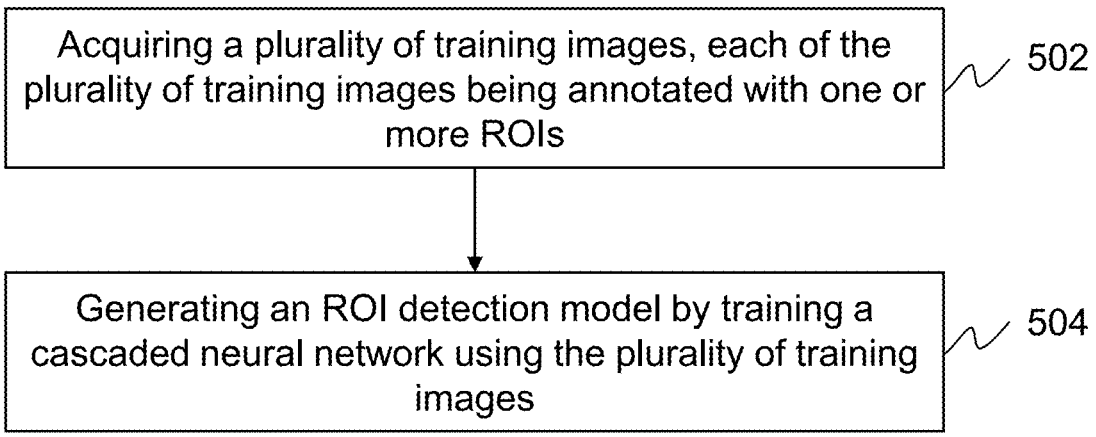
FIG. 5 is a flowchart illustrating an exemplary process for generating an ROI detection model according to some embodiments of the present disclosure.

FIG. 5 is a flowchart illustrating an exemplary process for generating an ROI detection model according to some embodiments of the present disclosure. In some embodiments, process 500 may be executed by the imaging system 100. For example, the process 500 may be implemented as a set of instructions (e.g., an application) stored in a storage device (e.g., the storage device 150, the storage 220, and/or the storage 390). In some embodiments, the processing device 140A (e.g., the processor 210 of the computing device 200, the CPU 340 of the mobile device 300, and/or one or more modules illustrated in FIG. 4A) may execute the set of instructions and may accordingly be directed to perform the process 500.

The ROI detection model may be a neural network model that is configured to receive a target image as an input, and output one or more ROIs and/or data related to the one or more ROIs in the target image. In some embodiments, the target image may be an image of an object. The object may include any organic or inorganic mass, such as a biological object and/or a non-biological object. As used herein, an ROI of the target image may refer to a portion in the target image that represents a physical region of interest of the object. For example, the target image may be an image of a patient, and the ROI of the target image may be a lesion area, a specific organ, a specific tissue, specific cell(s), or a whole body of the patient.

In some embodiments, the ROI may include a lesion of the object. The ROI detection model may be a lesion detection model configured to perform a lesion detection on the target image. A lesion may refer to a damage (or potential damage) and/or an abnormal change (or potential change) in the tissue of the object, usually caused by disease or trauma. Exemplary lesions may include a soft-tissue lesion, a diabetes-associated lesion, a bone lesion, a brain lesion, a skin lesion, a gastrointestinal lesion, an endodermal lesion, or the like, or any combination thereof.

In 502, the processing device 140A (e.g., the acquisition module 410, the processing circuits of the processor 210) may acquire a plurality of training images. Each training image may be annotated with one or more ROIs.

A training image may refer to an image of a sample object that has one or more known ROIs (which are annotated in the training image). In some embodiments, the sample object may be of the same type of object as the object in the target image. The ROI(s) in the training image may correspond to the same type of physical portion as the ROI(s) in the target image to be detected. For example, if the ROI detection model is used to detect a specific lesion (e.g., a prostatic cancer) on a target image of a patient, the training image may be an image of a sample patient, wherein one or more lesion areas representing the specific lesion of the sample patient are annotated in the image. As another example, if the ROI detection model is used to segment a specific organ from a target image of a patient, the training image may be an image of a sample patient, wherein the specific organ of the sample patient is annotated in the image. In some embodiments, a set of images may be annotated with different types of ROIs to generate different sets of training images, wherein the different sets of training images may be used to train different types of ROI detection models. For example, a set of chest CT images may be annotated with the heart to generate a set of training images used to train a heart detection model, and the set of chest CT images may be annotated with the lung to generate another set of training images used to train a lung detection model. In some embodiments, different sets of images may be annotated with different types of ROIs to generate different sets of training images, wherein the different sets of training images may be used to train different types of ROI detection models.

In some embodiments, the training image may be a one-dimensional image, a 2D image (e.g., a slice image), a 3D image, a 4D image, and/or any related image data (e.g., scan data, projection data), or the like. The training image may be stored in any image format, for example, a BMP format, a JPEG format, a TIFF format, a PNG format, a DICOM format, a VTK format, or the like. In some embodiments, the training image may include a plurality of elements, each of which may have a property value. For example, the training image may be a 2D image including a plurality of pixels, and each pixel may have a pixel value. As another example, the training image may be a 3D image including a plurality of voxels, and each voxel may have a voxel value. For the convenience of description, the term "pixel" and "voxel" in the present disclosure are used interchangeably to refer to an element of an image. In some embodiments, the training image may be generated using a biomedical imaging technique as described elsewhere in this disclosure. For example, the training image may be a CT image, an MRI image, an X-ray image, a PET image, an OCT image, a US image, an IVUS image, a NIRS image, etc. In some embodiments, the training image and the target image may be generated using the same biomedical imaging technique. For example, a plurality of CT images may be used as training images for generating an ROI detection model that is used to detect one or more ROIs in a target CT image.

In some embodiments, the ROI(s) of a training image may be annotated automatically, semi-automatically, or manually. In an automatic annotation approach, the ROI(s) of the training image may be annotated automatically by a computing device (e.g., the computing device 200 as illustrated in FIG. 2) based on an image analysis technique without user intervention. In a semi-automatic annotation approach, the ROI(s) of the training image may be annotated by a computing device (e.g., the computing device 200 as illustrated in FIG. 2) with user intervention. Exemplary user intervention may include providing information regarding a specific algorithm (e.g., a segmentation algorithm) to be used in ROI segmentation and/or annotation, a parameter (e.g., a location parameter) related to a region to be annotated, or the like, or a combination thereof. For instance, during a semi-automatic annotation, a user provides information identifying a characteristic feature (e.g., by marking it on an image to be annotated on a user interface displaying the image), and a computing device performs the ROI annotation based on the information in combination with a segmentation algorithm and/or parameter. In a manual annotation approach, the ROI(s) of the training image may be annotated by a user (e.g., a doctor) via a terminal device (e.g., the terminal 130). In some embodiments, the ROI(s) of different training images may be annotated by the same annotation approach or different annotation approaches.

In some embodiments, an ROI of a training image may be annotated in any suitable manner. For example, the ROI of the training image may be annotated by assigning a marker or a label to each pixel of the training image. The marker or the label assigned to the pixel may represent, for example, whether the pixel belongs to an ROI of the training image or not, a possibility that the pixel belongs to an ROI of the training image, etc. Merely by way of example, each pixel of the training image may be assigned with "0" or "1," wherein "0" represents that a pixel belongs to a non-ROI of the training image and "1" represents that a pixel belongs to an ROI of the training image. Optionally, the training image may be presented based on the maker or label assigned to each pixel of the training image. For example, the training image may be presented as a binary image, wherein one or more pixels assigned with "0" may be white and one or more pixels assigned with "1" may be black in the binary image. In such cases, in the training image, a white area may represent a non-ROI and a black area may represent an ROI.

Alternatively, the ROI of the training image may be annotated by a ground truth bounding box. The ground truth bounding box may refer to a bounding box enclosing a known ROI (e.g., an ROI annotated by a user) in the training image. The ground truth bounding box may have any shape and size. For example, the ground truth bounding box may have the shape of a square, a rectangle, a triangle, a polygon, a circle, an ellipse, an irregular shape, or the like. In some embodiments, the ground truth bounding box may be a minimum bounding box that has a preset shape (e.g., a rectangle, a square, a polygon, a circle, an ellipse) and encloses the ROI of the training image.

In some embodiments, the training images may be obtained by the processing device 140A from a storage device (e.g., the storage device 150, the storage 220, and/or the storage 390) of the imaging system 100 via a network (e.g., the network 120). For example, the training images may include a plurality of historical images generated using the imaging device 110, wherein the historical images have been annotated with one or more lesion areas by a doctor in diagnosis. The historical images may be stored in the storage device of the imaging system 100 and retrieved by the processing device 140A from the storage device. Additionally or alternatively, the training images may be obtained by the processing device 140A from an external source (e.g., a medical database) via a network (e.g., the network 120).

In 504, the processing device 140A (e.g., the model generation module 420, the processing circuits of the processor 210) may generate the ROI detection model by training a cascaded neural network using the training images.

Figure 12:
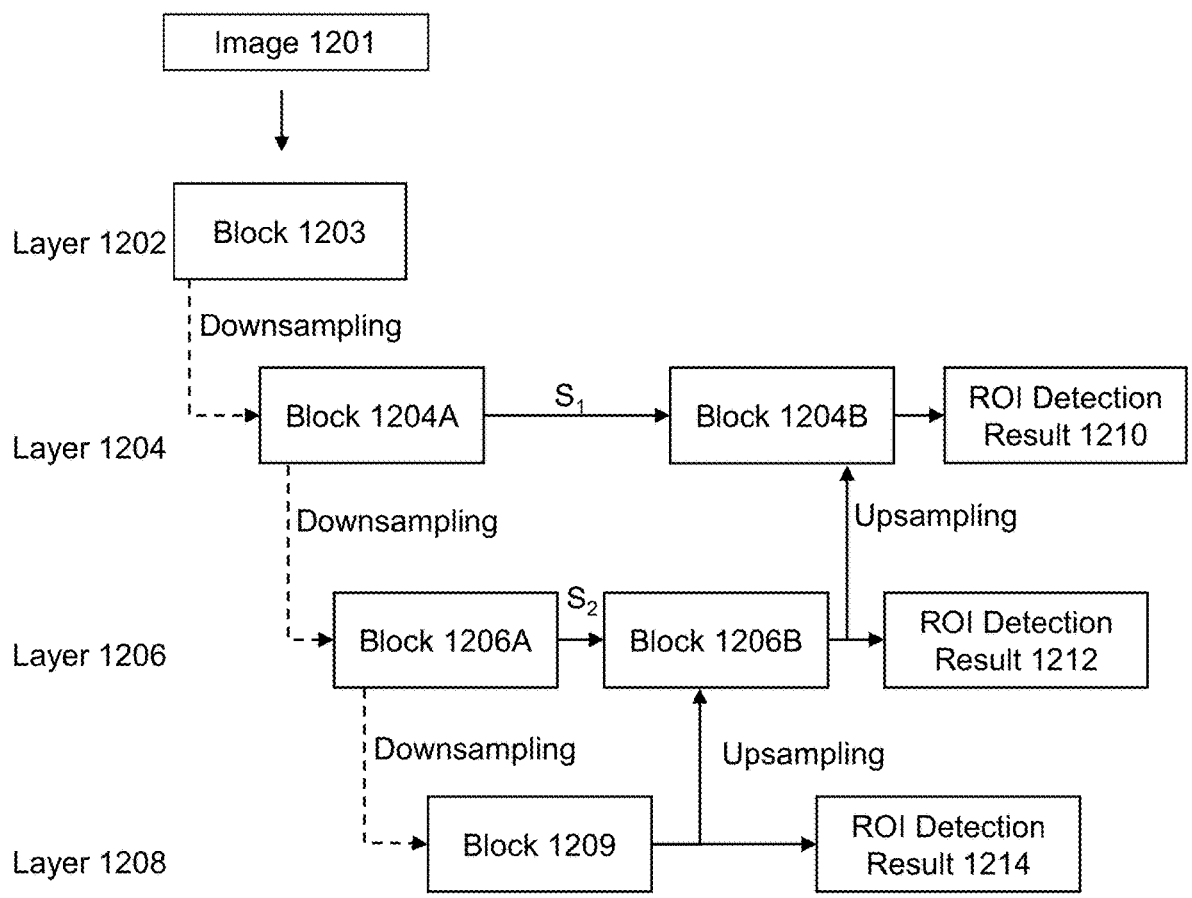
FIG. 12 is a schematic diagram illustrating an exemplary multi-scale ROI detection model according to some embodiments of the present disclosure.

The cascaded neural network may include a plurality of sequentially connected models. The plurality of models include a first model and at least one second model downstream to the first model in the cascaded neural network. For example, the cascaded neural network may be a cascaded neural network A including N models (i.e., a $1^{st}$ model, a $2^{nd}$ model, ..., and a $N^{th}$ model), wherein the $1^{st}$ model may be connected to the $2^{nd}$ model, the $2^{nd}$ model may be connected to the $3^{rd}$ model, ..., and the $(N-1)^{th}$ model may be connected to the $N^{th}$ model. In some embodiments, a model of the cascaded neural network may be a convolutional neural network (CNN) model, a faster region-based convolutional neural network (FASTER RCNN), a region proposal network (RPN), a classification network (e.g., a Visual Geometry Group (VGG) network, an Alex Krizhevsky (AlexNet), a ResNet (residual neural network)), a multi-scale model, or any other suitable type of model. The plurality of models of the cascaded neural network may be of the same type of model or different types of models. In some embodiments, at least one model of the cascaded neural network may be a multi-scale model configured to perform ROI detection at a plurality of resolution levels (or image scales). For example, the multi-scale model may have the same or similar structure as a multi-scale model 1200 as shown in FIG. 12.

In some embodiments, the models may be sequentially trained in the training of the cascaded neural network using different training samples. Taking the cascaded neural network A as an instance, the $1^{st}$ model, the $2^{nd}$ model, the $3^{rd}$ model, . . . , and the $N^{th}$ model may be trained in sequence. For each model, the processing device 140A may determine a plurality of training samples of the model based at least in part on the training images, and train the model using the corresponding training samples. In some embodiments, the training samples of the first model may be determined based on the training images by, for example, performing one or more operations of process 600A in FIG. 6A. The training samples of each of the at least one second model may be determined based on the training images and one or more trained models generated before the training of the second model. The one or more trained models generated before the training of a specific second model may refer to a previously trained model connected to the specific second model or one or more of all the trained model(s) generated before the training of the specific second model. For example, the one or more trained models before the training of the $i^{th}$ model of the cascaded neural network A may refer to the $(i-1)^{th}$ trained model or one or more of all the $1^{st}$ trained model, the $2^{nd}$ trained model, . . . , and the $(i-1)^{th}$ trained model that are generated before the training of the $i^{th}$ model. In some embodiments, the processing device 140A may perform one or more operations of process 600B in FIG. 6B to determine the training samples of the second model. In some embodiments, the training of a model of the cascaded neural network may include one or more iterations. For example, the processing device 140A may perform one or more iterations of process 700 as described in connection with FIG. 7 to train a model of the cascaded neural network.

It should be noted that the above description regarding the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added or omitted. For example, in operation 504, the processing device 140A may preprocess the training images, and generate the ROI detection model based on the preprocessed training images. The preprocessing of the training images may include, for example, an image frittering, an image normalization, an image denoising, or the like, or any combination thereof. For example, the processing device 140A may normalize the pixel values of a plurality of pixels in the training images to a specific range (e.g., 0-255) based on a window width and/or a window level of the pixels. In some embodiments, after the ROI detection model is generated, the processing device 140A may further test the ROI detection model using a set of testing images. Additionally or alternatively, the processing device 140A may update the ROI detection model periodically or irregularly based on one or more newly-generated training images (e.g., new annotated images generated in medical diagnosis).

FIG. 6A is a flowchart illustrating an exemplary process for determining a plurality of training samples of a first model of a cascaded neural network according to some embodiments of the present disclosure. In some embodiments, process 600A may be executed by the imaging system 100. For example, the process 600A may be implemented as a set of instructions (e.g., an application) stored in a storage device (e.g., the storage device 150, the storage 220, and/or the storage 390). In some embodiments, the processing device 140A (e.g., the processor 210 of the computing device 200, the CPU 340 of the mobile device 300, and/or one or more modules illustrated in FIG. 4A) may execute the set of instructions and may accordingly be directed to perform the process 600A. In some embodiments, one or more operations of the process 600A may be performed to achieve at least part of operation 504 as described in connection with FIG. 5.

In 602, the processing device 140A (e.g., the training sample generation module 415, the processing circuits of the processor 210) may determine a plurality of first negative samples of the first model and a plurality of positive samples based on the plurality of training images. As used herein, a first negative sample may refer to a negative sample to be used for training the first model. Each first negative sample may be indicative of at least a portion of a non-ROI in the training images. Each of the positive samples may be indicative of at least a portion of an ROI in the training images.

In some embodiments, a sample (e.g., a first negative sample, a positive sample) may be a pixel. For example, the processing device 140A may designate a pixel in an ROI of a training image as a positive sample, and designate a pixel outside the ROI(s) of a training image as a first negative sample. In some embodiments, as described in operation 502, each pixel in the training images may be assigned with a marker or a label (e.g., "0" or "1") to indicate whether the pixel belongs to an ROI or not. In such a case, the processing device 140A may determine the first negative samples and the positive samples based on the markers or the labels of the pixels of the training images. For example, a pixel is assigned with "1" and a pixel assigned with "0" may be regarded as a positive pixel in an ROI and a negative pixel in a non-ROI of the training images, respectively. The processing device 140A may designate all or a portion of the positive pixels of the training images as the positive samples, and designate all or a portion of the negative pixels of the training images as the first negative samples.

In some embodiments, a sample (e.g., a first negative sample, a positive sample) may be an anchor box. As used herein, an anchor box may refer to a template bounding box that encloses a pixel in a training image and represents a candidate ROI enclosing the pixel. An anchor box may have a preset shape (e.g., a square, a rectangle, a triangle, a polygon, a circle, an irregular shape) and/or a preset size (e.g., 5 mm×5 mm, 5 mm×10 mm, 10 mm×10 mm). In some embodiments, for each of a plurality of pixels in the training images, the processing device 140A may define one or more anchor boxes enclosing the pixel to represent one or more candidate ROIs enclosing the pixel. Optionally, each pixel may be located at a center of each corresponding anchor box defined for the pixel. In some embodiments, a plurality of anchor boxes may be defined for each pixel of the training images, wherein the anchor boxes may have different shapes and/or sizes to represent different candidate ROIs enclosing the pixel. For example, for a training image including 512×512 pixels, the processing device 140A may define nine anchor boxes for each pixel of the training image, thereby generating 512×512×9 anchor boxes. The nine anchor boxes of each pixel may have different shapes and/or different sizes. Merely by way of example, the nine anchor boxes may be rectangles having different sizes.

After the anchor boxes are defined, the processing device 140A may compare the anchor boxes with the ROIs of the training images to generate a comparison result. For example, in some embodiments, the ROIs of the training images may be annotated using a plurality of ground truth bounding boxes as described in operation 502. For each anchor box in each training image, the processing device 140A may determine an intersection over union (IOU) between the anchor box and each ground truth bounding box. The processing device 140A may further determine the first negative samples and the positive samples among the anchor boxes based on the comparison result. For example, for an anchor box in a training image, if an IOU between the anchor box and a specific ground truth bounding box in the training image is greater than an IOU threshold (e.g., 0.5, 0.8, or 0.9), the anchor box may be regarded as a positive anchor box corresponding to the ground truth bounding box. If an IOU between the anchor box and each ground truth bounding box in the training image is smaller than the IOU threshold, the anchor box may be regarded as a negative anchor box. For each anchor box in each training image, the processing device 140A may determine whether the anchor box is a positive anchor box or a negative anchor box. Further, the processing device 140A may designate all or a portion of the positive anchor boxes of the training images as the positive samples, and designate all or a portion of the negative anchor boxes of the training images as the first negative samples.

In some embodiments, a ratio of a count of the positive samples to a count of the first negative samples may be equal to or greater than a threshold ratio. The threshold ratio may be equal to any suitable value, for example, 0.15, 0.16, 0.17, 0.18, 0.19, 0.2, 0.21, etc. For example, the threshold ratio may be equal or close to 0.2. In some cases, a number (or count) of the positive pixels (or positive anchor boxes) may be much smaller than a number (or count) of the negative pixels (or negative anchor boxes). For example, a ratio of a count of positive pixels in lesion areas of a plurality of training images to a count of negative pixels outside the lesion areas of the training images may be equal to or smaller than $1:10^6$. Training the first model directly using all the positive pixels (or positive anchor boxes) and the negative pixels (or negative anchor boxes) of the training images may generate a trained first model having low accuracy. Therefore, it is desirable that the processing device 140A determines the first negative samples and the positive samples based on the positive pixels (or positive anchor boxes) and the negative pixels (or negative anchor boxes) so that the ratio reaches a desirable value. For example, the processing device 140A may select a part of the negative pixels (or negative anchor boxes) of the training images as the first negative samples of the first model, and select all of the positive pixels (or positive anchor boxes) as the positive samples, wherein a ratio of a count of the selected positive samples to a count of the selected negative samples may be equal to or greater than 0.2.

In 604, the processing device 140A (e.g., the training sample generation module 415, the processing circuits of the processor 210) may designate the first negative samples and the positive samples as the training samples of the first model.

It should be noted that the above description regarding the process 600A is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added or omitted. For example, the processing device 140A may update the training samples of the first model periodically or irregularly based on one or more newly-generated training images (e.g., new annotated images generated in medical diagnosis). In some embodiments, the positive pixels (or positive anchor boxes) and the negative pixels (or negative anchor boxes) may be previously determined for the training images and stored in a storage device. The processing device 140A may obtain the determination result from the storage device, and determine the training samples of the first model based on the determination result.

In some embodiments, the processing device 140A may determine a ground truth classification map based on the training samples of the first model. The ground truth classification map may include a ground truth classification of each training sample of the first model regarding whether the training sample is a positive sample or a negative sample. For example, in the ground truth classification map, a positive sample (e.g., a positive pixel or a positive anchor box) may be labeled with "1" and a negative sample (e.g., a negative pixel or a negative anchor box) of the first model may be labeled with "0."

In some embodiments, the training samples of the first model may include a plurality of anchor boxes. The processing device 140A may determine the ground truth classification map as well as a ground truth regression map. The ground truth regression map may include one or more ground truth location parameters of at least one of the anchor boxes. In some embodiments, the ground truth regression map may include one or more ground truth location parameters of each positive anchor box. The ground truth location parameter(s) of a positive anchor box may indicate a ground truth position or a ground truth size of the positive anchor box relative to a corresponding ground truth bounding box. Merely by way of example, the positive anchor box and the corresponding ground truth bounding box may be boxes in a 3D space (e.g., a space defined by an X-axis, a Y axis, and a Z axis). The ground truth location parameter(s) of the positive anchor box may include one or more of $\Delta x$, $\Delta y$, $\Delta z$, $\Delta s_x$, $\Delta s_y$, and $\Delta s_z$. $\Delta x$, $\Delta y$ and $\Delta z$ may refer to distances between a center point of the positive anchor box and a center point of the corresponding ground truth bounding box along the X-axis, the Y-axis, and the Z-axis, respectively. $\Delta s_x$, $\Delta s_y$, and $\Delta s_z$ may refer to a length difference along the X-axis, a width difference along the Y-axis, and a height difference along the Z-axis between the positive anchor box and the corresponding ground truth bounding box. As another example, the positive anchor box and the corresponding ground truth bounding box may be boxes in a 2D space (e.g., a space defined by the X-axis and the Y axis). The ground truth location parameter(s) of the positive anchor box may include one or more of $\Delta x$, $\Delta y$, $\Delta s_x$, and $\Delta s_y$.

In some embodiments, the ground truth classification map and/or the ground truth regression map may be used to train a model (e.g., the first model, a second model) of the cascaded neural network. More descriptions regarding the use of the ground truth classification map and/or the ground truth regression map in model training may be found elsewhere in the present disclosure. See, e.g., FIG. 7 and relevant descriptions thereof.

Figure 6B:
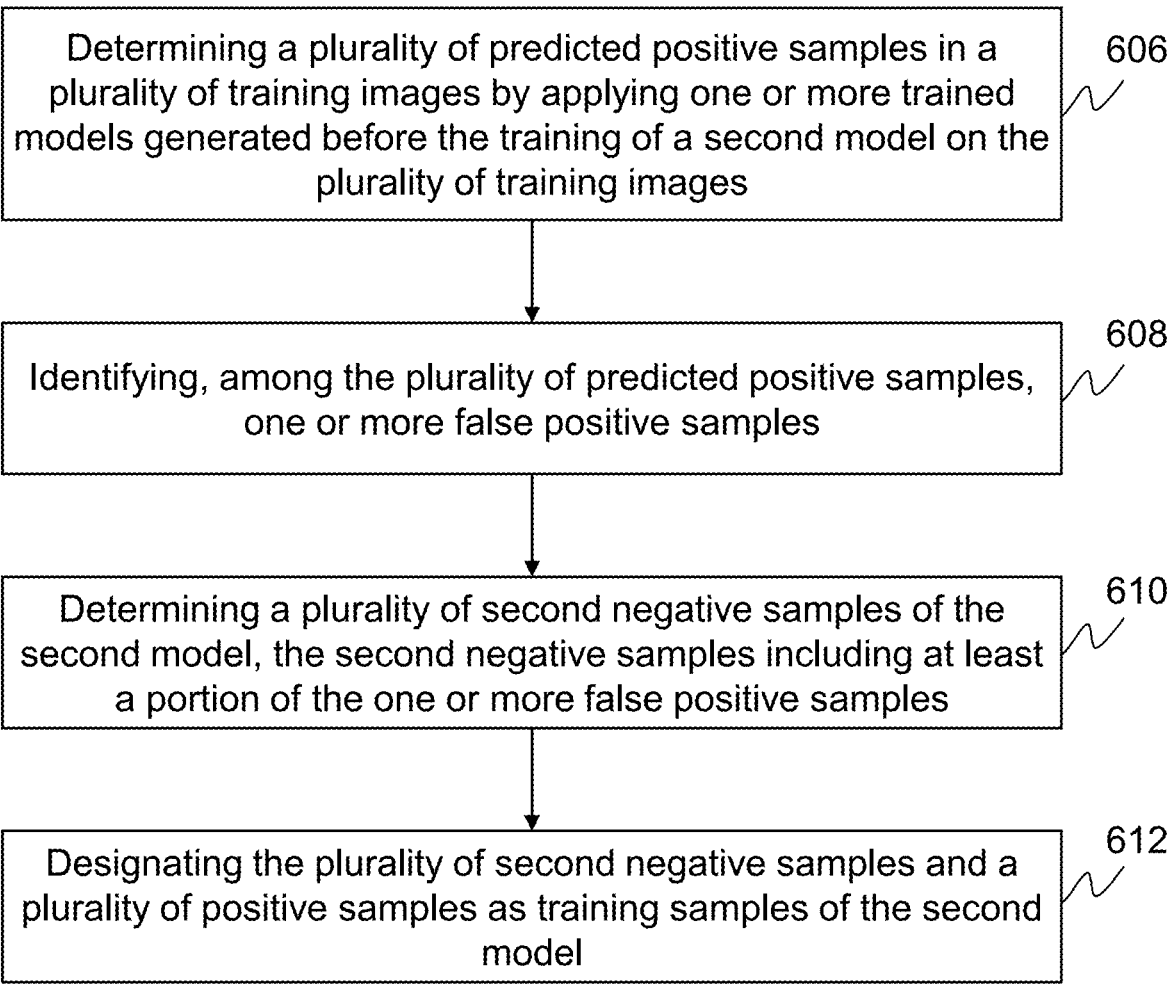
FIG. 6B is a flowchart illustrating an exemplary process for determining a plurality of training samples of a second model of a cascaded neural network according to some embodiments of the present disclosure.

FIG. 6B is a flowchart illustrating an exemplary process for determining a plurality of training samples of a second model of a cascaded neural network according to some embodiments of the present disclosure. In some embodiments, process 600B may be executed by the imaging system 100. For example, the process 600B may be implemented as a set of instructions (e.g., an application) stored in a storage device (e.g., the storage device 150, the storage 220, and/or the storage 390). In some embodiments, the processing device 140A (e.g., the processor 210 of the computing device 200, the CPU 340 of the mobile device 300, and/or one or more modules illustrated in FIG. 4A) may execute the set of instructions and may accordingly be directed to perform the process 600B.

In some embodiments, one or more operations of the process 600B may be performed to achieve at least part of operation 504 as described in connection with FIG. 5. In some embodiments, the cascaded neural network may include a plurality of sequentially connected second models. The process 600B may be sequentially performed for each second model. For illustration purposes, an implementation of the process 600B for a second model is described hereinafter.

In 606, the processing device 140A (e.g., the training sample generation module 415, the processing circuits of the processor 210) may determine a plurality of predicted positive samples by applying the one or more trained models generated before the training of the second model to the training images. The predicted positive samples may represent a plurality of predicted ROIs in the training images.

As described in connection with 604, the one or more trained model(s) generated before the training of the second model may include a previously trained model connected to the second model or one or more of all the trained model(s) generated before the training of the second model. For example, the one or more trained models before the training of the $i^{th}$ model of the cascaded neural network A may refer to the $(i-1)^{th}$ trained model or one or more of all the $1^{st}$ trained model, the $2^{nd}$ trained model, . . . , and the trained model that are generated before the training of the $i^{th}$ model. The processing device 140A may apply the trained model(s) to the training images to generate an output of the trained model(s). The processing device 140A may further determine the predicted positive samples based on the output of the trained model(s).

In some embodiments, the training samples of the first model may include a plurality of pixels of the training images. The processing device 140A may determine a plurality of predicted positive pixels based on the output of the trained model(s), and designate the predicted positive pixels as the predicted positive samples. Alternatively, the training samples of the first model may include a plurality of anchor boxes of the training images. The processing device 140A may determine a plurality of predicted positive anchor boxes based on the output of the trained model(s), and designate the predicted positive anchor boxes as the predicted positive samples. More descriptions regarding the determination of the predicted positive pixels and/or the predicted positive anchor boxes may be found elsewhere in the present disclosure. See, e.g., operation 704 in FIG. 7 and relevant descriptions thereof.

In 608, the processing device 140A (e.g., the training sample generation module 415, the processing circuits of the processor 210) may identify, among the predicted positive samples, one or more false positive samples.

As used herein, a false positive sample may refer to a negative sample (e.g., a negative pixel, a negative anchor box) that is determined as a predicted positive sample by one or more trained models. In some embodiments, the processing device 140A may compare the predicted positive samples with the true positive samples (which is described in operation 602). If a predicted positive sample is not a true positive sample, the predicted positive sample may be designated as a false positive sample. For example, the false positive sample(s) may include a predicted positive pixel which is actually a negative pixel and/or a predicted positive anchor box which is actually a negative anchor box. In some embodiments, the predicted positive samples are the predicted positive anchor boxes, the processing device 140A may compare the predicted positive anchor boxes with the ground truth bounding boxes. If an IOU between a predicted positive anchor box and each ground truth bounding box is smaller than an IOU threshold, the predicted positive anchor box may be designated as a false positive sample.

In some embodiments, the processing device 140A may determine a false positive rate of the trained model(s) generated before the training of the second model to measure accuracy of the trained model(s). The false positive rate of the trained model(s) may be assessed based on the ratio of a count of the determined false positive sample(s) to a count of the positive samples (e.g., a count of the true positive samples, a count of the true positive samples plus the false positive samples).

In 610, the processing device 140A (e.g., the training sample generation module 415, the processing circuits of the processor 210) may determine a plurality of second negative samples of the second model. The second negative samples may include at least a portion of the one or more false positive samples. As used herein, a second negative sample may refer to a negative sample to be used for training the second model.

In some embodiments, the second negative samples may include all or a portion of the false positive sample(s). Additionally or alternatively, the second negative samples may also include one or more negative pixels or one or more negative anchor boxes. As described in FIG. 6A, a portion of the negative pixels or negative anchor boxes of the training images may be selected as the first negative samples of the first model. The second negative samples may include all or a portion of the remaining negative pixels or negative anchor boxes of the training images that are not included in the first negative samples. In some embodiments, a ratio of a count of the second positive samples to a count of the negative samples may be equal to or greater than a threshold ratio (e.g., 0.15, 0.2, 0.25).

In 612, the processing device 140A (e.g., the training sample generation module 415, the processing circuits of the processor 210) may designate the second negative samples and the positive samples as the training samples of the current second model. The positive samples of the current second model may include all or a portion of the positive samples used to train the first model or one or more second models already trained prior to the training of the current second model. For instance, the positive samples of the current second model may include all the positive samples used to train the first model or one or more second models already trained prior to the training of the current second model.

According to some embodiments of the present disclosure, the training samples of the second model may include one or more false positive samples predicted by the trained model(s) generated before the training of the second model. The second model may be trained to learn one or more features of the false positive sample(s), thus being more reliable in distinguishing a non-ROI from an ROI than the tainted model(s) generated before the training of the second model. This may further improve the accuracy and performance of the ROI detection model to be generated.

It should be noted that the above description regarding the process 600B is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added or omitted. For example, the processing device 140A may update the training samples of the second mode periodically or irregularly based on one or more newly-generated training images (e.g., new annotated images generated in medical diagnosis).

Figure 7:
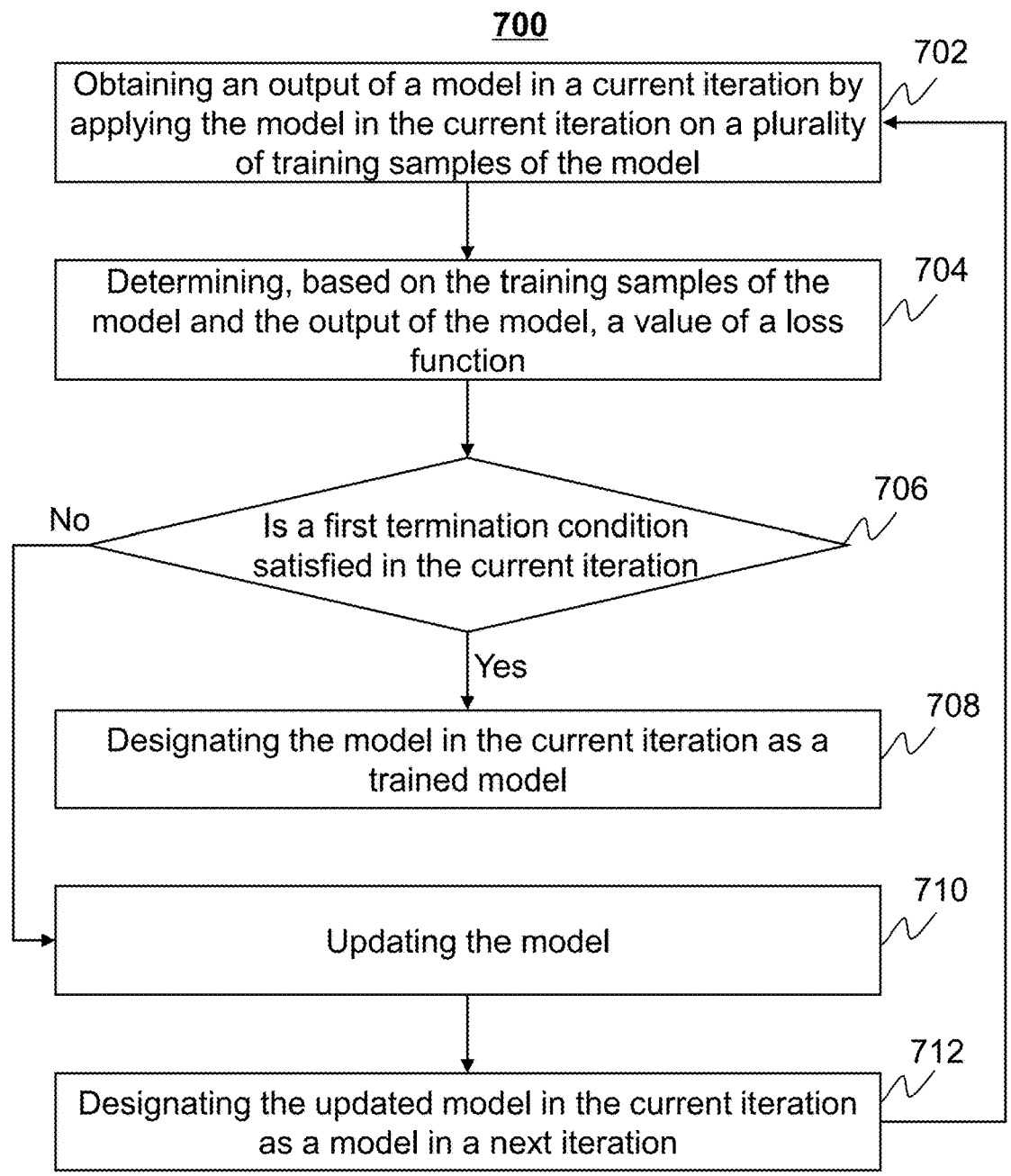
FIG. 7 is a flowchart illustrating an exemplary process for generating a trained model by training a model using a plurality of training samples of the model according to some embodiments of the present disclosure.

FIG. 7 is a flowchart illustrating an exemplary process for generating a trained model by training a model using a plurality of training samples of the model according to some embodiments of the present disclosure. In some embodiments, process 700 may be executed by the imaging system 100. For example, the process 700 may be implemented as a set of instructions (e.g., an application) stored in a storage device (e.g., the storage device 150, the storage 220, the storage 390). In some embodiments, the processing device 140A (e.g., the processor 210 of the computing device 200, the CPU 340 of the mobile device 300, and/or one or more modules illustrated in FIG. 4A) may execute the set of instructions and may accordingly be directed to perform the process 700.

In some embodiments, one or more operations of the process 700 may be performed to achieve at least part of operation 504 as described in connection with FIG. 5. In some embodiments, the cascaded neural network may include a plurality of sequentially connected models including a first model and at least one second model downstream to the first model. The process 700 may be sequentially performed for the each model of the cascaded neural network. For illustration purposes, an implementation of the process 700 for a model of the cascaded neural network is described hereinafter.

In the model to be trained may have one or more model parameters. Exemplary model parameters may include the number (or count) of layers, the number (or count) of nodes, a loss function, or the like, or any combination thereof. Before the training, the model may have one or more initial parameter values of the model parameter(s). In the training of the model, one or more parameter values of the model may be updated. In some embodiments, the training of the model may include one or more iterations. For illustration purposes, a current iteration of the iteration(s) is described in the following description. The current iteration may include one or more operations of the process 700.

In 702, the processing device 140A (e.g., the model generation module 420, the processing circuits of the processor 210) may obtain an output of the model in the current iteration by applying the model in the current iteration to the plurality of training samples of the model.

In some embodiments, the training samples of the model may include a plurality of pixels as described elsewhere in this disclosure (e.g., FIGS. 6A and 6B, and the relevant descriptions). The output of the model may include a first probability map. The first probability map may include a plurality of first probability values of the pixels, each first probability value being indicative of a predicted probability that a corresponding pixel belongs to an ROI.

In some embodiments, the training samples of the model may include a plurality of anchor boxes as described elsewhere in this disclosure (e.g., FIGS. 6A and 6B, and the relevant descriptions). Each anchor box may enclose a pixel in the training images and represent a candidate ROI enclosing the pixel. The output of the model may include a second probability map and a regression map. The second probability map may include a plurality of second probability values of the anchor boxes, each second probability value being indicative of a predicted probability that a corresponding anchor box belongs to an ROI. The regression map may include one or more predicted location parameters of one or more of the anchor boxes, each predicted location parameter being indicative of a predicted position of a corresponding anchor box relative to an ROI, a predicted size of the corresponding anchor box relative to an ROI, or the like, or a combination thereof. The predicted location parameter(s) of an anchor box may include one or more similar parameters as the ground truth location parameter(s) of a positive anchor box as described in connection with FIG. 6A. In some embodiments, the regression map may include one or more predicted location parameters of each of the anchor boxes. Alternatively, the regression map may include one or more predicted location parameters of a portion of the anchor boxes, such as the positive anchor boxes determined in 602.

In 704, the processing device 140A (e.g., the model generation module 420, the processing circuits of the processor 210) may determine a value of a loss function based on the training samples and the output of the model.

As used herein, a loss function may refer to a function that measures a difference between the output of the model and the actual value, wherein the difference may indicate the accuracy of the model. In some embodiments, the training samples of the model may include a plurality of pixels, and the output of the model may include the first probability map as described in connection with 702. The loss function may be a first classification loss configured to measure the accuracy of the model in classifying the pixels. In some embodiments, the processing device 140A may determine a first predicted classification map including a predicted classification of each pixel based on the first probability value of the pixel. The first predicted classification of each pixel may indicate whether the pixel is predicted to belong to an ROI or not. For example, if a pixel in the training sample has a first probability value greater than a threshold value $T_1$, the pixel may be classified as a predicted positive pixel which is predicted to be within an ROI of a training image. If a pixel in the training sample has a first probability value smaller than the threshold value $T_1$, the pixel may be classified as a predicted negative pixel which is predicted to be within a non-ROI of a training image. The processing device 140A may determine the first classification loss by comparing the first predicted classification map and the ground truth classification map (as described in FIG. 6A). The first classification loss may be, for example, a log loss function, a cross-entropy loss function.

In some embodiments, the threshold value $T_1$ may be a default setting of the imaging system 100 or be determined by the processing device 140A according to the first probability map outputted in the current iteration. In some embodiments, the processing device 140A may determine the threshold value $T_1$, wherein the determined threshold value $T_1$ may be such that all or at least a certain portion (e.g., 99%, 95%) of the positive samples are determined as predicted positive samples identified using the model, as trained, according to the determined threshold value $T_1$. For example, the determined threshold value $T_1$ may be smaller than the smallest first probability value of the positive pixels in the pixels, such that each positive pixel in the pixels may be determined as a predicted positive pixel.

In some embodiments, the training samples of the model may include a plurality of anchor boxes, and the output of the model may include the second probability map and the regression map as described in connection with 702. The loss function may include a second classification loss associated with the second probability map and a regression loss associated with the regression map. The second classification loss may be used to measure the accuracy of the model in classifying the anchor boxes. In some embodiments, the processing device 140A may determine a second predicted classification map including a predicted classification of each anchor box based on the second probability value of the anchor box. For example, if an anchor box in the training sample has a second probability value greater than a threshold value $T_2$, the anchor box may be classified as a predicted positive anchor box. If an anchor box in the training sample has a second probability value smaller than the threshold value $T_2$, the anchor box may be classified as a predicted negative anchor box. The processing device 140A may determine the second classification loss by comparing the second predicted classification map and the ground truth classification map. The second classification loss may be, for example, a log loss function, a cross-entropy loss function, etc. The regression loss may be configured to measure the accuracy of the model in determining location parameters of the anchor boxes. The processing device 140A may determine the regression loss by comparing the regression map with the ground truth regression map (as described in FIG. 6A). The regression loss may be, for example, an L1 norm function, an L2 norm function, etc. In some embodiments, the value of the loss function may be determined based on the value of the second classification loss alone, the value of the regression loss alone, or a combination thereof. For instance, the value of the loss function may be equal to the value of the second classification loss, or the value of the regression loss, or a sum (or weighted sum) of the values of the second classification loss and the regression loss. In some embodiments, similar to the threshold value $T_1$, the threshold value $T_2$ may be a default setting of the imaging system 100 or be determined by the processing device 140A according to the second probability map. For example, the threshold value $T_2$ may be determined in a similar manner as the threshold value $T_1$, and the descriptions thereof are not repeated here.

In 706, the processing device 140A (e.g., the model generation module 420, the processing circuits of the processor 210) may determine whether a first termination condition is satisfied in the current iteration based on the value of the loss function.

An exemplary first termination condition may be that the value of the loss function obtained in the current iteration is less than a threshold value. Other exemplary first termination conditions may include that a certain count of iterations have been performed, that the loss function converges such that the difference of the values of the loss function obtained in a previous iteration and the current iteration is within a threshold value, etc.

In 708, upon a determination that the first termination condition is satisfied in the current iteration, the processing device 140A (e.g., the model generation module 420, the processing circuits of the processor 210) may proceed to operation 710. In 710, the processing device 140A (e.g., the model generation module 420, the processing circuits of the processor 210) may designate the model in the current iteration as the trained model.

Upon a determination that the first termination condition is not satisfied in the current iteration, the processing device 140A may proceed to operation 712. In 712, the processing device 140A (e.g., the model generation module 420, the processing circuits of the processor 210) may update the model. For example, the processing device 140A may update the value(s) of the model parameter(s) of the model based on the value of the loss function according to, for example, a backpropagation algorithm.

In 712, the processing device 140A (e.g., the model generation module 420, the processing circuits of the processor 210) may designate the updated model in the current iteration as a model in a next iteration.

After 712, the processing device 140A may proceed to operation 702 to perform the next iteration until the first termination condition is satisfied. After the first termination condition is satisfied in a certain iteration, the model in the certain iteration having the updated value(s) of the model parameter(s) may be designated as the trained model.

In some embodiments, the model may be a second model of the cascaded neural network. After the trained second model is generated, the processing device 140A may further determine whether a second termination condition is satisfied to determine whether the training of the cascaded neural network is finished. Taking the $M^{th}$ model of the cascaded neural network A as an instance, the processing device 140A may determine whether the second termination condition is satisfied based on the $1^{st}$ trained model, the $2^{nd}$ trained model, . . . , and the $M^{th}$ trained model. An exemplary second termination condition may be that a certain number (or count) of trained models has been produced after the $M^{th}$ model is trained (i.e., that M is equal to the certain number). The certain number may be equal to a positive integer, such as 3, 4, 5, 6, etc. Another exemplary second termination condition may be that a false positive rate of all the trained models (i.e., the $1^{st}$ trained model to the $M^{th}$ trained model) is smaller than a threshold value $T_3$.

Upon a determination that the second termination condition is satisfied, the processing device 140A may designate a trained cascaded neural network as the ROI detection model. The trained cascaded neural network may include the trained second model and all the trained model(s) generated before the training of the second model (i.e., the $1^{st}$ trained model, the $2^{nd}$ trained model, . . . , and the $M^{th}$ trained model). In response to a determination that the second termination condition is not satisfied, the processing device 140A may add a new second model (i.e., $(M+1)^{th}$ model) downstream to the $M^{th}$ trained model. The processing device 140A may further train the $(M+1)^{th}$ model and determine whether the second termination condition is satisfied after a $(M+1)^{th}$ trained model is generated. The training of the cascaded neural network may be terminated until the second termination condition is satisfied for a latest trained model.

It should be noted that the above description regarding the process 700 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added or omitted. For example, the processing device 140A may further test the trained model using a set of testing samples to determine whether a testing condition is satisfied. If the testing condition is not satisfied, the process 700 may be performed again to further train the model.

Figure 8:
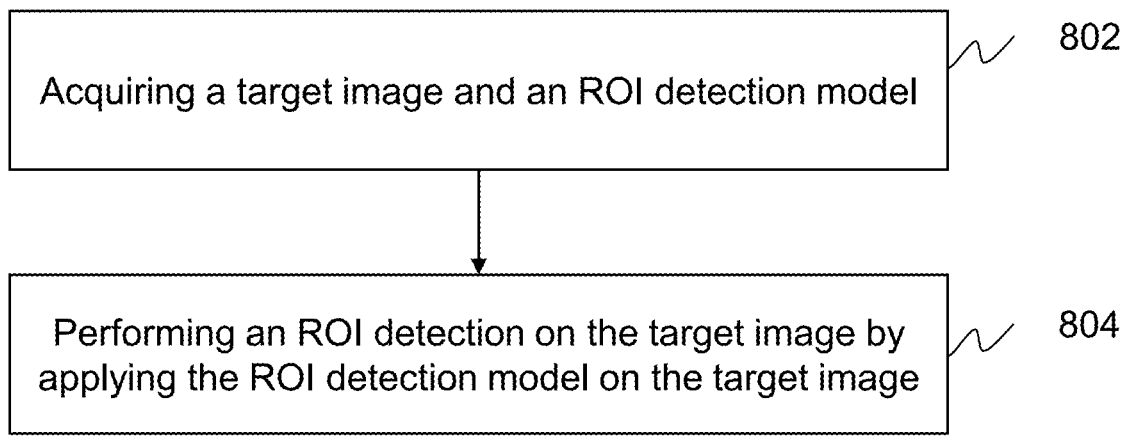
FIG. 8 is a flowchart illustrating an exemplary process for performing ROI detection on a target image using an ROI detection model according to some embodiments of the present disclosure.

FIG. 8 is a flowchart illustrating an exemplary process for performing ROI detection on a target image using an ROI detection model according to some embodiments of the present disclosure. In some embodiments, process 800 may be executed by the imaging system 100. For example, the process 800 may be implemented as a set of instructions (e.g., an application) stored in a storage device (e.g., the storage device 150, the storage 220, and/or the storage 390). In some embodiments, the processing device 140B (e.g., the processor 210 of the computing device 200, the CPU 340 of the mobile device 300, and/or one or more modules illustrated in FIG. 4B) may execute the set of instructions and may accordingly be directed to perform the process 800.

In 802, the processing device 140B (e.g., the acquisition generation module 430, the processing circuits of the processor 210) may acquire the target image and the ROI detection model.

The ROI detection model may refer to a neural network model that is configured to receive the target image as an input, and output one or more ROIs and/or data related to the one or more ROIs in the target image. In some embodiments, the ROI detection model may be a trained cascaded neural network including a plurality of sequentially connected trained models. The trained models may include a trained first model and at least one trained second model downstream to the trained first model in the trained cascaded neural network. In some embodiments, the ROI detection model may be trained by a processing device (e.g., the processing device 140A, the processing device 140B) by performing a method (e.g., the process 500) for generating an ROI detection model disclosed herein. For example, the plurality of trained models may be sequentially trained. Each trained second model may be trained using a plurality of training samples determined based on one or more trained models of the plurality of trained models generated before the generation of the second trained model. More descriptions regarding the ROI detection model may be found elsewhere in the present disclosure. See, e.g., FIG. 5 and relevant descriptions thereof. In some embodiments, at least one trained model of the ROI detection model may include a multi-scale trained model configured to perform ROI detection at a plurality of resolution levels. For example, the multi-scale trained model may have a similar structure as a multi-scale model 1200 as shown in FIG. 12.

In some embodiments, the target image and/or the ROI detection model may be obtained from one or more components of the imaging system 100 or an external source via a network (e.g., the network 120). For example, the ROI detection model may be trained by a processing device (e.g., the processing device 140A), and stored in a storage device (e.g., the storage device 150, the storage 220, and/or the storage 390) of the imaging system 100. The processing device 140B may access the storage device and retrieve the ROI detection model.

In 804, the processing device 140B (e.g., the ROI detection module 440, the processing circuits of the processor 210) may perform ROI detection on the target image by applying the ROI detection model to the target image.

In some embodiments, the trained models may be configured to perform ROI detection independently in a parallel manner. The target image and/or data related to the target image may be inputted into each trained model, and each trained model may be configured to generate an output in response to the input to the trained model. The output of each trained model may directly form an ROI detection result of the ROI detection model. Alternatively, the processing device 140B may obtain the output of each trained model, and determine the ROI detection result (e.g., one or more ROIs in the target image) based on the output of each trained model. In some embodiments, the trained models may be configured to perform ROI detection sequentially in a serial manner. Each of the trained models may be configured to generate an output in response to an input to the trained model. The input to the trained first model may include the target image and/or data related to the target image. The input to each trained second model may include an output of an upstream trained model connected to the trained second model. The output of a last trained model of the ROI detection model may directly form the ROI detection result of the ROI detection model. Alternatively, the processing device 140B may obtain an output of the last trained model, and determine the ROI detection result (e.g., one or more ROIs in the target image) based on the output of the last trained model.

In some embodiments, the target image may include a plurality of target pixels. The output of each trained model may include a first preliminary probability map, which includes a plurality of first preliminary probability values of the target pixels. Each first preliminary probability value may be indicative of a preliminary probability that a corresponding target pixel belongs to an ROI of the target image. In the cases in which the trained models operate in a parallel manner, the processing device 140B may determine a first target probability map based on the first preliminary probability maps outputted by the trained models. The first target probability map may include a plurality of first target probability values of the target pixels, wherein each first target probability value may be indicative of a target probability that a corresponding target pixel belongs to an ROI of the target image. For example, for a certain target pixel, the corresponding first target probability value may be determined by multiplying the first preliminary probability value of the certain target pixel in each first preliminary probability map. As another example, for each trained model, the processing device 140B may generate a first preliminary classification map based on the corresponding first preliminary probability map, wherein a target pixel having a first preliminary probability value higher than a threshold value $T_3$ is assigned with a first classification value "1" in the first preliminary classification map, and a target pixel having a first preliminary probability value lower than the threshold value $T_3$ is assigned with a first classification value "0" in the first preliminary classification map. The threshold value $T_3$ of different trained models may be the same or different. In some embodiments, the threshold value $T_3$ of a trained model may be determined in the generation process of the trained model (e.g., in process 700 as described in connection with FIG. 7). The first target probability value of a certain target pixel in the first target probability map may be determined by multiplying all the first classification values of the certain target pixel in the first preliminary classification maps. For example, the first target probability value of the certain target pixel may be 0 if one or more of the first classification values are "0." The processing device 140B may further determine the one or more ROIs of the target image based on the first target probability map. For example, the processing device 140 may segment a region in the target image as an ROI of the target image, wherein the segmented region may include one or more target pixels whose first target probability values are 1 or greater than a threshold value $T_4$ (e.g., 0.8, 0.85, 0.9, 0.95).

In the cases in which that the trained models operate in a serial manner, each trained model may determine one or more target pixels whose first preliminary probability values are greater than the threshold value $T_3$ as one or more predicted ROIs and transmit the predicted ROI(s) to a next trained model for further detection. The processing device 140B may obtain the first preliminary probability map of the last trained model, and select one or more target pixels of the target image whose first preliminary probability values in the obtained first preliminary probability map is greater than the threshold value $T_4$ as the ROI(s) of the target image.

In some embodiments, each target pixel of the target image may have a plurality of target anchor boxes enclosing the target pixel and representing a candidate ROI enclosing the target pixel. A target anchor box of a target pixel may be similar to an anchor box of a pixel of a training image as described elsewhere in this disclosure (e.g., FIG. 5 and the relevant descriptions). The output of each trained model may include a second preliminary probability map and a target regression map. The second preliminary probability map of a trained model may include a plurality of second preliminary probability values of the target anchor boxes. Each second preliminary probability value of a target anchor box may be indicative of a preliminary probability that a corresponding candidate ROI is an ROI of the target image. The target regression map may include least one target location parameter of at least one of the target anchor boxes, each location parameter of a target anchor box being indicative of a position of the target anchor box relative to an ROI of the target image, or a size of the target anchor box relative to an ROI of the target image.

In the cases in which the trained models operate in a parallel manner, the processing device 140B may determine the ROI(s) of the target image based on the second preliminary probability maps and the target regression map of the trained models. A determined ROI of the target image may also be referred to as a bounding box representing an ROI. For example, the processing device 140B may determine a second target probability map including a plurality of second target probability values of the target anchor boxes based on the second preliminary probability maps of the trained models. Each second target probability value of a target anchor box may be indicative of a target probability that a corresponding candidate ROI is an ROI of the target image. In some embodiments, for each trained model, the processing device 140B may determine a second classification map including a second classification value of each target anchor box in, for example, a similar manner as determining the first classification map as described above. The processing device 140B may further determine a second target probability value of each target anchor box by multiplying a corresponding second preliminary probability value outputted by the last trained model and the corresponding second classification values in all the second classification maps.

The processing device 140B may further determine one or more preliminary ROIs of the target image based on a target regression map of the last trained model and the second target probability map. For example, the processing device 140B may select one or more target anchor boxes whose second target probability values are greater than a threshold value $T_5$. The processing device 140B may adjust the position and/or a size of the selected target anchor box(es) based on the target regression map of the last trained model, wherein the adjusted target anchor box(es) may be regarded or designated as the preliminary ROI(s). For example, the target regression map may include a predicted distance between a target anchor box and an ROI of the target image along a certain direction. The processing device 140B may move the target anchor box by the predicted distance along the certain direction to generate an adjusted target anchor box (i.e., a preliminary ROI).

The processing device 140B may further determine the ROI(s) of the target image based on the preliminary ROI(s). In some embodiments, the preliminary ROI(s) may include a plurality of preliminary ROIs. The processing device 140B may determine the ROI(s) of the target image by performing a non-maximum suppressing on the preliminary ROIs to remove one or more overlapping preliminary ROIs (if any). For example, the processing device 140B may perform one or more iterations. In each iteration, the processing device 140B may rank the preliminary ROIs in the current iteration based on the second target probability values of the preliminary ROIs in a descending order. For a top-ranked preliminary ROI in the ranking result, the processing device 140B may determine and remove one or more preliminary ROIs similar to the top-ranked preliminary ROIs, e.g., a preliminary ROI whose IOU with the top-ranked preliminary ROI is greater than a threshold IOU. The processing device 140B may designate the top-ranked preliminary ROI as an ROI of the target image. If there are a plurality of remaining preliminary ROIs, the processing device 140B and designate the remaining preliminary ROIs as the preliminary ROIs in a next iteration and proceed to the next iteration. In some embodiments, the preliminary ROI(s) may be directly designated as the ROI(s) of the target image without processing.

In the cases in which that the trained models operate in a serial manner, each trained model may determine one or more target anchor boxes whose second preliminary probability values are greater than a threshold value $T_6$ as one or more predicted ROIs and transmit the predicted ROI(s) to a next trained model (e.g., the immediately downstream trained model) for further detection. The processing device 140B may determine the ROI(s) of the target image based on the second preliminary probability map and the target regression map outputted by the last trained model. For example, the processing device 140B may determine one or more preliminary ROIs based on the second preliminary probability map and the target regression map outputted by the last trained model. The processing device 140B may then determine the ROI(s) of the target image based on the preliminary ROI(s), for example, by performing a non-maximum suppressing on the preliminary ROI(s). The ROI(s) of the target image may be determined based on the second preliminary probability map and the target regression map of the last trained model in a similar manner as how the ROI(s) of the target image is determined based on the target regression map of the last trained model and the second target probability map.

In some embodiments, the ROI detection result may include one or more ROIs of the target image determined by the processing device 140B as described above. An ROI of the target image may be represented or characterized by position information, size information, shape information of the ROI, or the like, or any combination thereof. For example, the ROI of the target image may be represented or characterized by a coordinate of central point (or each target pixel) of the ROI and a size of the ROI. In some embodiments, the ROI detection result may be determined by the processing device 140 based on the output of the ROI detection model as described above. Optionally, the one or more ROIs may include a plurality of ROIs, and the processing device 140 may postprocess the ROIs to generate the ROI detection result. For example, the processing device 140 may remove one or more noise points, such as a pixel in a non-ROI surrounded by pixels in an ROI, a pixel in an ROI surrounded by pixels in a non-ROI, or the like, or any combination thereof. As another example, the processing device 140 may perform a connected-component analysis to determine one or more large connected regions (e.g., a region having a size greater than a first threshold size) formed by ROIs and/or remove one or more small connected regions (e.g., a region having a size smaller than a second threshold size) formed by ROIs, wherein the large connected region(s) may be outputted in the ROI detection result. In some alternative embodiments, the ROI detection model may include one or more additional components (e.g., a softmax function) configured to determine the ROI detection result based on the output of each trained model of the ROI detection model. In such a case, the ROI detection model may direct output the ROI detection result of the target image.

According to some embodiments of the present disclosure, the trained models of the ROI detection model may be trained sequentially. Each trained model may be generated based on different training samples and have different ROI detection accuracies. The trained models may be applied parallel or sequentially to detect the ROI(s) in the target image. The detected ROI(s) may need to be verified by each trained model. For example, a target pixel may be regarded as a pixel of an ROI only if each trained model predicts that the target pixel is a pixel in an ROI of the target image. This may improve the accuracy of the ROI detection result.

It should be noted that the above description of the process 800 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the operations of the process 800 are intended to be illustrative. The process 800 may be accomplished with one or more additional operations not described and/or without one or more of the operations herein discussed. Additionally, the order in which the operations of the process 800 described above is not intended to be limiting. For example, the process 800 may include an additional operation in which the processing device 140B transmits the ROI detection result to a terminal device for display.

Figure 9:
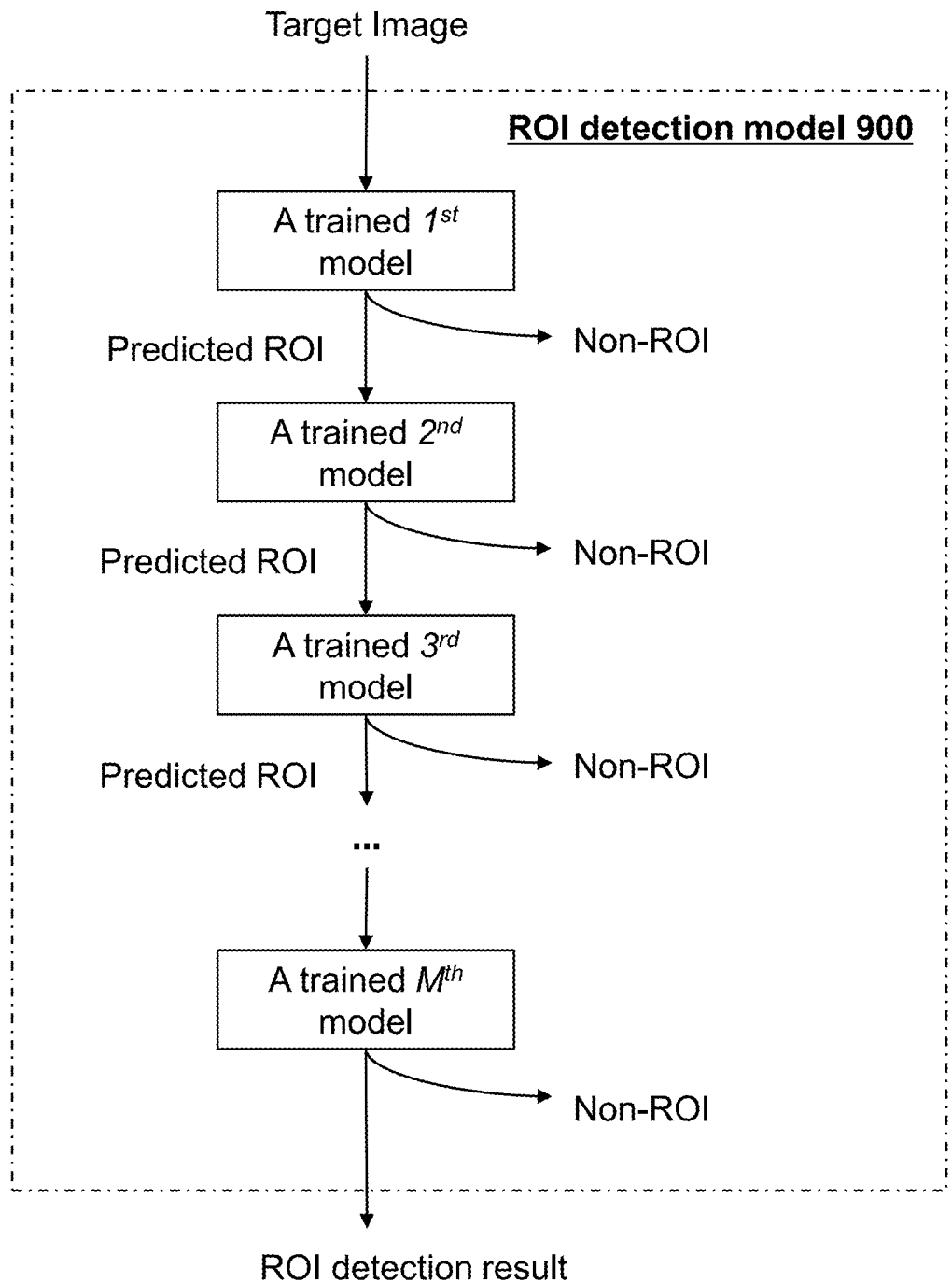
FIG. 9 is a schematic diagram illustrating an exemplary ROI detection model according to some embodiments of the present disclosure.

FIG. 9 is a schematic diagram illustrating an exemplary ROI detection model 900 according to some embodiments of the present disclosure. As shown in FIG. 9, the ROI detection model 900 may be a trained cascaded neural network including M sequentially connected trained models, i.e., a trained $1^{st}$ model, a trained $2^{nd}$ model, a trained 3rd model, . . . , and a trained $M^{th}$ model.

The ROI detection model 900 may be an exemplary ROI detection model as described in connection with FIG. 8, which is configured to perform ROI detection on a target image. The trained models of the ROI detection model 900 may be configured to perform ROI detection sequentially. The input to the trained $1^{st}$ model may include the target image, the input to the trained $2^{nd}$ model may include an output of the trained $1^{st}$ model, the input to the trained $3^{rd}$ model may include an output of the trained $2^{nd}$ model, . . . , and the input to the trained $M^{th}$ model may include an output of the trained $(M-1)^{th}$ model. The one or more ROIs of the target image may be determined based on an output of the trained $M^{th}$ model. In some embodiments, the output of each trained model may include one or more predicted ROIs in the target image as shown in FIG. 9. The predicted ROIs may include one or more target pixels or target anchor boxes of the target image. For a specific trained model, the one or more predicted ROIs outputted by the specific trained model may be transmitted to a downstream trained model for further verification, wherein a portion of the one or more predicted ROIs may be verified by the downstream trained model as predicted ROIs as well, while the other portion of the one or more predicted ROIs may be determined as non-ROIs by the downstream trained model.

Figure 10:
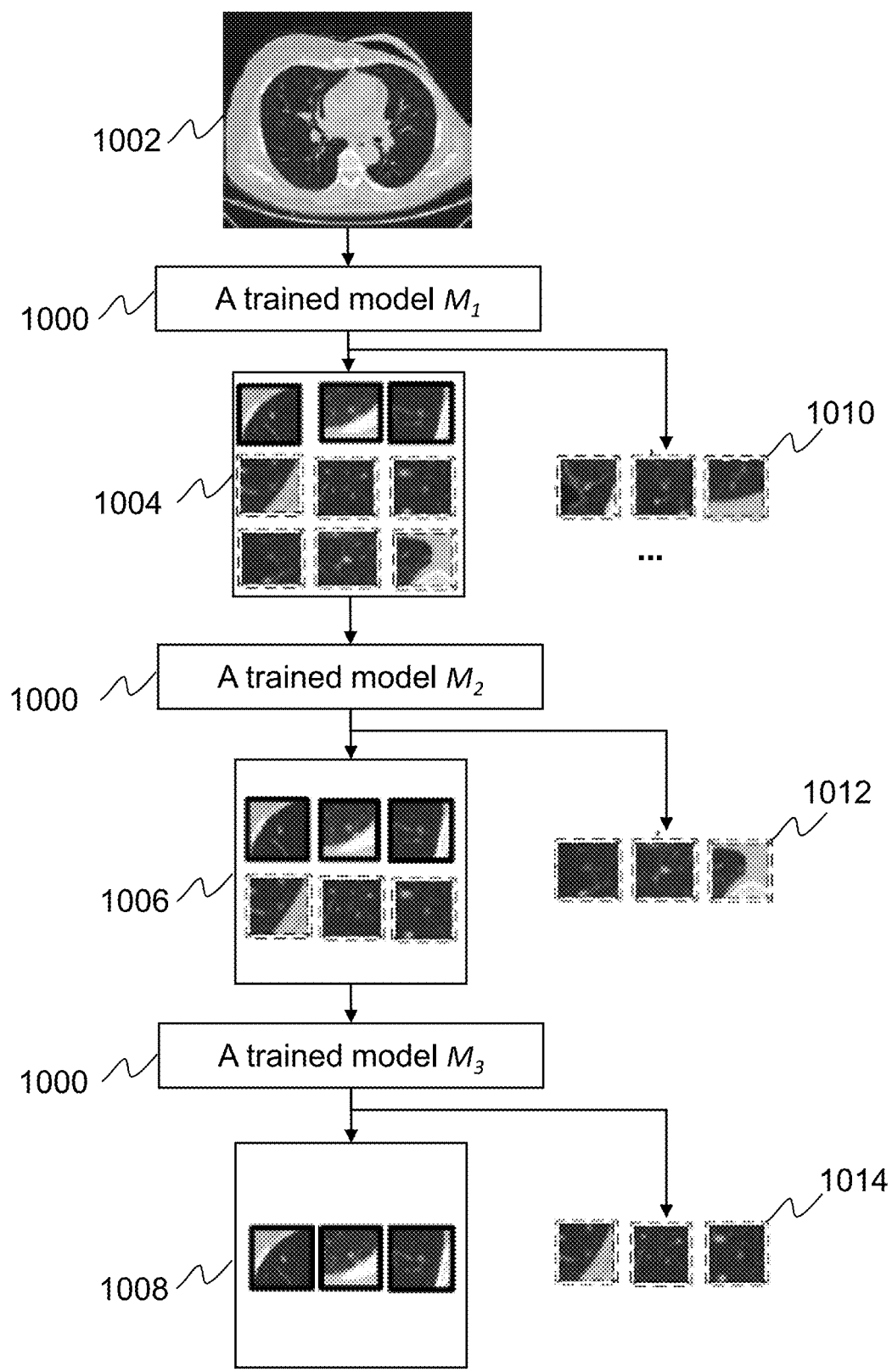
FIG. 10 is a schematic diagram illustrating an exemplary process for performing lesion detection on a target image using a lesion detection model according to some embodiments of the present disclosure.

FIG. 10 is a schematic diagram illustrating an exemplary process for performing lesion detection in a target image 1002 using a lesion detection model 1000 according to some embodiments of the present disclosure.

The lesion detection model 1000 is an exemplary ROI detection model as described in connection with FIG. 8. The target image 1002 is a CT image of a chest with one or more pulmonary nodules. As shown in FIG. 10, the lesion detection model 1000 includes a trained model $M_1$, a trained model $M_2$, and a trained model $M_3$. The target image 1002 was inputted into the trained model $M_1$. The trained model $M_1$ identified a plurality of predicted lesion areas 1004 and a plurality of predicted non-lesion areas 1010 from the target image. Each predicted lesion area 1004 may be represented by a block (which includes one or more of pixels) of the target image. The predicted lesion areas 1004 were inputted into the trained model $M_2$ for further detection, while the predicted non-lesion areas 1010 were omitted from further detection. The trained model $M_2$ identified a plurality of predicted lesion areas 1006 and a plurality of predicted non-lesion areas 1012 from the predicted lesion areas 1004. The predicted lesion areas 1006 were inputted into the trained model $M_3$ for further detection, while the predicted non-lesion areas 1012 were omitted from further detection. The trained model $M_3$ further identified a plurality of non-lesion areas 1014 and a plurality of lesion areas 1008 from the predicted lesion areas 1006. The predicted lesion areas 1008 were designated as a plurality of lesion areas of the target image 1002.

As shown in FIG. 10, a predicted lesion area enclosed by a solid box represents a true lesion area, and a predicted lesion area enclosed by a dotted box represents a false lesion area. The trained model $M_3$ were generated based on one or more false positive samples of the trained models $M_1$ and $M_2$, and therefore more reliable in distinguishing a non-lesion from a lesion than the trained models $M_1$ and $M_2$. The false lesion areas of the trained model $M_1$ and $M_2$ were further verified and removed by the trained model $M_3$. It is indicated that, compared with using a single trained model (e.g., the trained model $M_1$ or $M_2$), using the lesion detection model 1000 may improve accuracy of lesion detection and avoid misdiagnosis.

It should be noted that the examples in FIGS. 9 and 10 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the trained models of the ROI detection model 900 may perform ROI detection in a parallel manner as described in connection with operation 804. As another example, the ROI detection model 900 and the lesion detection model 1000 may include any number of trained models.

Figure 11:
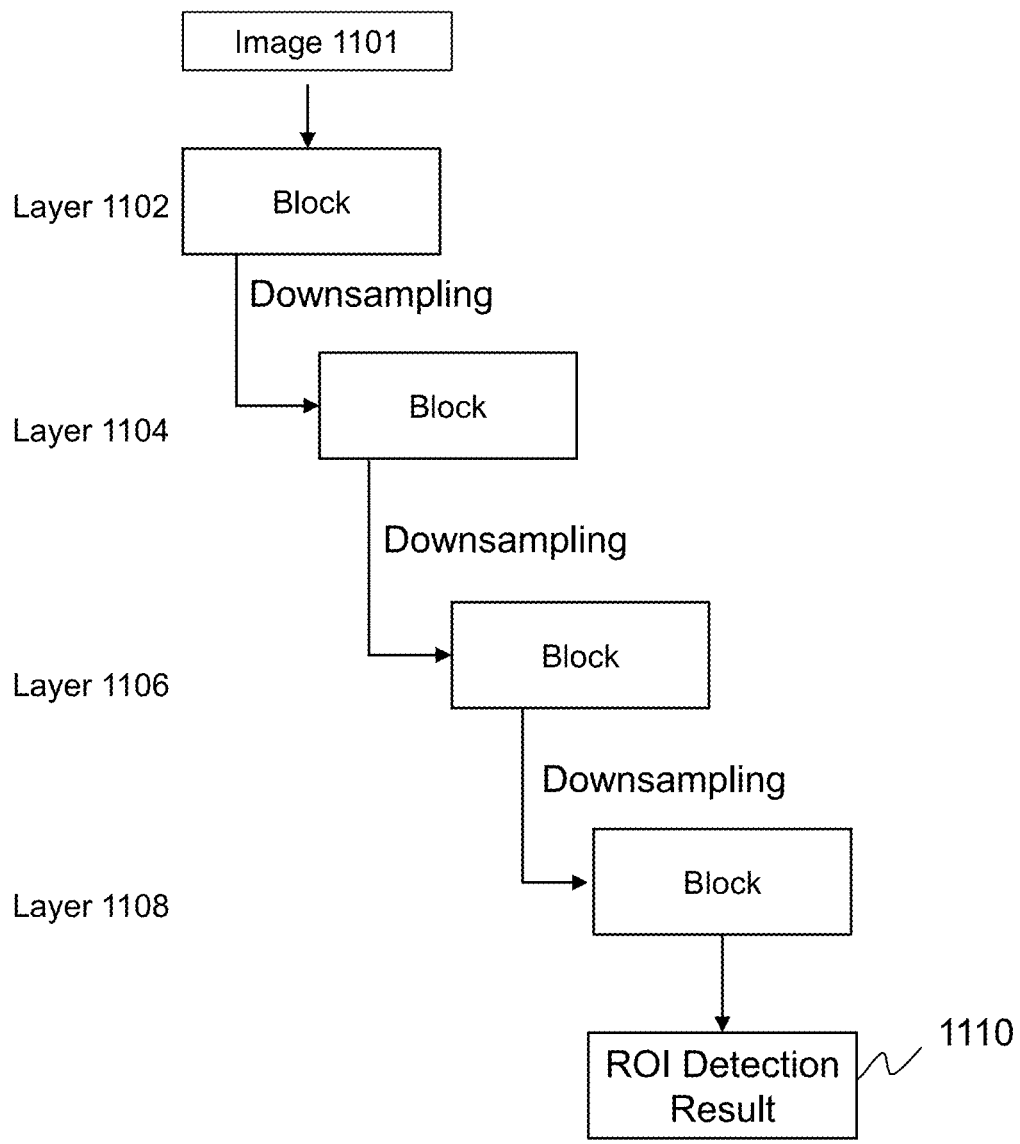
FIG. 11 is a schematic diagram illustrating an exemplary single-scale ROI detection model according to some embodiments of the present disclosure.

FIG. 11 is a schematic diagram illustrating an exemplary single-scale model 1100 according to some embodiments of the present disclosure.

The single-scale model 1100 may be configured to perform ROI detection in an image 1101 at a single resolution level. As shown in FIG. 11, the single-scale model 1100 includes four sequentially connected layers, i.e., layers 1102, 1104, 1106, and 1108. Each layer includes a neural network block for feature extraction. A layer other than the layer 1108 is connected to a next layer via a first downsampling path. The first downsampling path may refer to a path of the single-scale model 1100 that connects the layers 1102 to 1108, along which information (e.g., an output of a specific layer) may be downsampled. For example, the layer 1102 may receive the image 1101 as an input and generate an output by processing the image, wherein the output of the layer 1102 is downsampled (e.g., downsampled using a max pooling operator) and the downsampled output is transmitted to the layer 1104. An ROI detection result 1110 may be outputted by the layer 1108. Because of the first downsampling path, the ROI detection result 1110 may correspond to a lower resolution than the image 1101, which may result in a loss of high-resolution image information and/or an undetected ROI due to its small size (e.g., an ROI having a size smaller than the resolution of ROI detection result 1110).

FIG. 12 is a schematic diagram illustrating an exemplary multi-scale model 1200 according to some embodiments of the present disclosure.

The multi-scale model 1200 (referred to as a model 1200 for brevity) may be configured to perform ROI detection in an image 1201 at a plurality of resolution levels. In some embodiments, the model 1200 may be a component of an ROI detection model (e.g., the ROI detection model 900).

As shown in FIG. 12, the model 1200 may include four layers (i.e., layers 1202, 1204, 1206, and 1208). The layer 1202 may also be referred to as a first layer of the model 1200, the layer 1208 may also be referred to as a last layer of the model 1200, and the layers 1204 and 1206 may also be referred to as middle layers of the model 1200. Each layer of the model 1200 other than the layer 1208 (i.e., the last layer) is connected to a next layer via a second downsampling path. The second downsampling path may refer to a path in the model 1200 that connects blocks 1203, 1204A, 1206A, and 1209, along which information (e.g., an output of a specific block) may be downsampled. Each layer other than the layer 1202 (i.e., the first layer) and the layer 1204 is connected to a previous layer via an upsampling path. The upsampling path may refer to a path in the model 1200 that connects blocks 1209, 1204A, 1206B, and 1204B, along which information (e.g., an output of a specific block) may be upsampled. Each of the layers 1204 to 1208 may correspond to one of the resolution levels and configured to generate an ROI detection result at the corresponding resolution level.

The layer 1202 includes a block 1203. The layer 1204 includes a block 1204A, a block 1204B, and a skip connection $S_1$ connecting the blocks 1204A and 1204B. The layer 1206 includes a block 1206A, a block 1206B, and a skip connection $S_2$ connecting the blocks 1206A and 1206B. The layer 1208 includes a block 1209. A block of a layer may be a neural network component used for feature extraction, such as one or more convolution operators and/or a neural network model (e.g., a residual network). Different layers of the model 1200 may be of the same type or different types of blocks. A skip connection connecting two blocks may be configured to connect the two blocks, for example, transmitting an output of one of the blocks to the other block.

Taking the layer 1204 as an instance, the skip connection $S_1$ may transmit a feature vector outputted by the block 1204A to the block 1204B. It should be noted that the skip connection $S_1$ and $S_2$ are provided for illustration purposes, and may be replaced by any other connection component that can be used to connect a plurality of blocks.

In operation, the image 1201 is inputted into the block 1203 of the layer 1202, wherein the block 1203 may generate an output (e.g., a feature map or a feature vector) by processing the image 1201. The output of the block 1203 may be downsampled and the downsampled output may be transmitted to the block 1204A of the layer 1204 for further analysis. In some embodiments, the downsampling of the output of the block 1203 may be performed by a max pooling operator. Similarly, an output of the block 1204A and an output of the block 1206A may be downsampled and transmitted to the block 1206A and the block 1209, respectively. An output of the block 1209 may be upsampled and transmitted to the block 1206B of the layer 1206. Similarly, an output of the block 1206B may be upsampled and transmitted to the block 1204B of the layer 1204. In the layer 1204, the block 1204A may extract one or more features from the downsampled output of the block 1203. The feature(s) extracted by the block 1204A may be transmitted to the block 1204B via the skip connection $S_1$. The feature(s) extracted by the block 1204A in combination with the upsampled output of the block 1206B may serve as an input to the block 1204B. The block 1204B may extract one or more features based on the input. The feature(s) extracted by the block 1204A may provide more detailed information of the image 1201 (or also referred to as information at a fine scale). The upsampled output of the block 1206B may provide more global information of the image 1201 (or also referred to as information at a coarse scale). The input of the block 12046 may include both the detailed information and the global information of the image 1201, thereby the feature(s) extracted by the block 12046 may provide more comprehensive information of the image 1201. The layer 1204 may further generate an ROI detection result 1210 based on the feature(s) generated by the block 1204B. Similar to the layer 1204, the layer 1206 may generate an ROI detection result 1212. The layer 1208 may generate an ROI detection result 1214 based on an output of the block 1209. The layers 1204, 1206, and 1208 may correspond to different resolution levels and have different detection accuracies regarding ROIs of different sizes. For example, the layer 1204 may have a higher accuracy in detecting small ROIs, and the layer 1208 may have a higher accuracy in detecting large ROIs. As such, the model 1200 may detect ROIs of different sizes and have a higher ROI detection accuracy than a single-scale model (e.g., the single-scale model 1100).

It should be noted that the examples illustrated in FIGS. 11 and 12 are provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. For example, the model 1200 may include any number of layers. Each layer may include any number of blocks and/or skip connections. As another example, the model 1200 may include one or more additional components and/or one or more components illustrated in FIG. 12 may be omitted. In some embodiments, an ROI detection result outputted by a layer of the model 1200 may include a probability map and/or a regression map as described elsewhere in this disclosure (e.g., FIG. 8 and the relevant descriptions).

Figure 13:
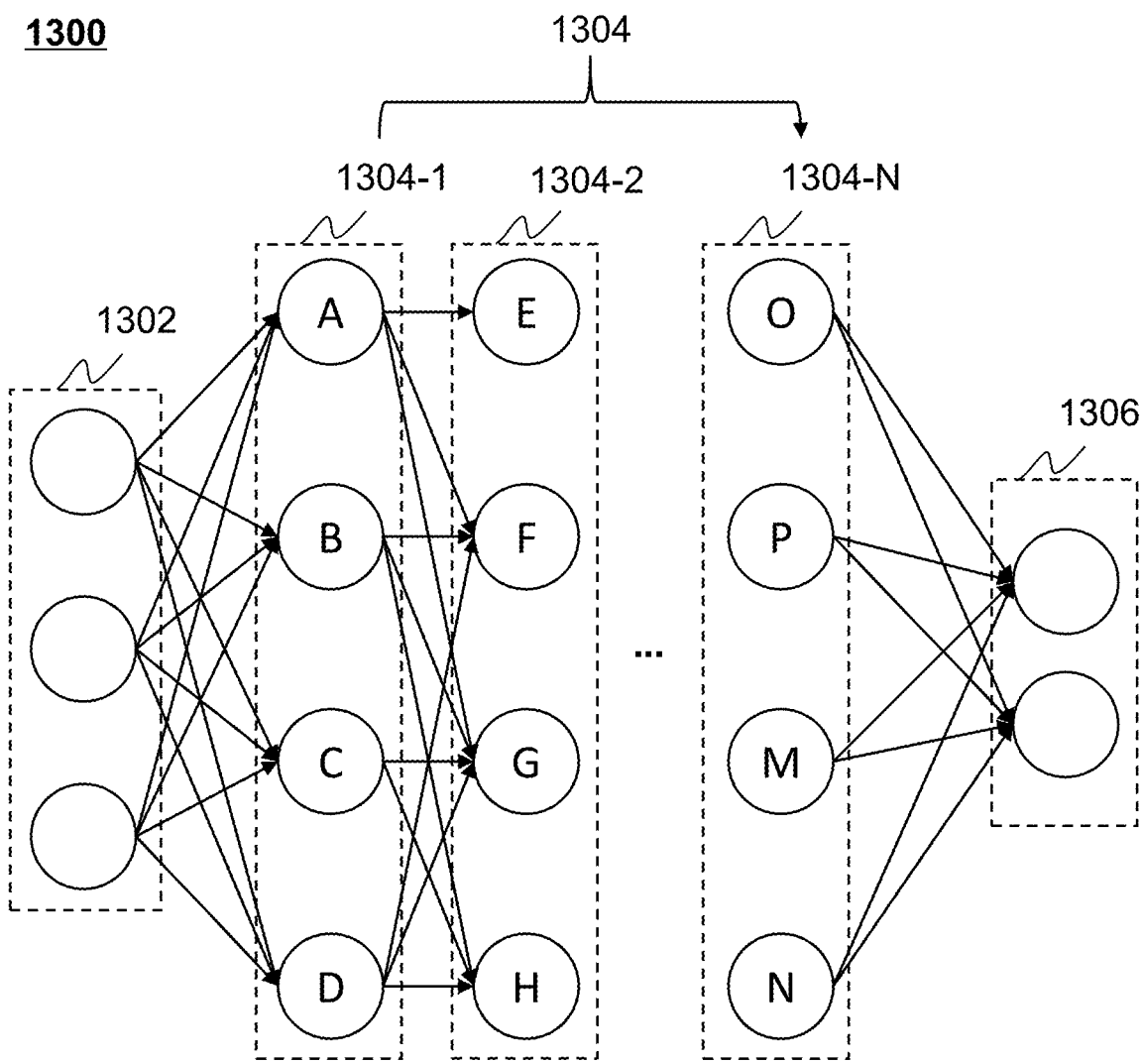
FIG. 13 is a schematic diagram illustrating an exemplary CNN model according to some embodiments of the present disclosure.

FIG. 13 is a schematic diagram illustrating an exemplary CNN model 1300 according to some embodiments of the present disclosure. In some embodiments, the CNN model 1300 may be a component of an ROI detection model as described elsewhere in this disclosure (e.g., FIGS. 5 and 8 and the relevant descriptions)

As shown in FIG. 13, the CNN model 1300 may include an input layer 1302, a plurality of hidden layers 1304, and an output layer 1306. The hidden layers 1304 may include one or more convolutional layers, one or more rectified linear unit (ReLU) layers, one or more pooling layers, one or more fully connected layer, or the like, or any combination thereof. For illustration purposes, exemplary hidden layers 1304, including a convolutional layer 1304-1, a pooling layer 1304-2, and a fully connected layer 1304-N, are provided in FIG. 13.

In some embodiments, an image (e.g., a training image, a target image) may be inputted into the CNN model 1300. The image may be represented as a 2D matrix or a 3D matrix including a plurality of elements (e.g., pixels or voxels). Each of the plurality of elements in the matrix may have a value representing a feature or characteristic of the element.

The convolutional layer 1304-1 may include a plurality of kernels (e.g., A, B, C, and D), which may be used to extract a feature of the image. In some embodiments, each kernel of the plurality of kernels may filter a portion of the image to generate a specific feature corresponding to the portion. The specific feature may be determined based on the kernels. Exemplary features may include a low-level feature (e.g., an edge feature, a textural feature), a high-level feature, or a complicated feature.

The pooling layer 1304-2 may take an output of the convolutional layer 1304-1 as an input. The pooling layer 1304-2 may include a plurality of pooling nodes (e.g., E, F, G, and H), which may be used to sample the output of the convolutional layer 1304-1, so as to reduce the computational load of data processing and accelerate the speed of data processing speed. In some embodiments, a size of the matrix representing the image may be reduced in the pooling layer 1304-2.

The fully connected layer 1304-N may include a plurality of neurons (e.g., O, P, M, and N). The neurons may be connected to the pooling nodes in the pooling layer 1304-2. In the fully connected layer 1304-N, a plurality of vectors corresponding to the plurality of pooling nodes may be determined based on one or more features of the image, and a plurality of weighting coefficients may be assigned to the plurality of vectors.

The output layer 1306 may determine an output based on the vectors and the weighting coefficients obtained from the fully connected layer 1304-N. In some embodiments, an output of the output layer 1306 may include a probability map, a classification map, and/or a regression map as described elsewhere in this disclosure (e.g., FIGS. 5 and 8 and the relevant descriptions).

In some embodiments, the CNN model may be implemented on one or more processing devices (e.g., the processing device 140, the processor 210 of the computing device 200). In some embodiments, a plurality of processing devices may execute a parallel processing operation in some layers of the CNN model 1300 by, for example, assigning two or more processing devices for an operation of different nodes (e.g., a kernel, a pooling node, a neuron) in the CNN model 1300. For example, a first GPU may execute the operation corresponding to the kernel A and kernel B, and a second kernel may execute the operation corresponding to the kernel C and kernel D. Similarly, a plurality of GPUs may also execute the operation of other nodes (e.g., a kernel, a pooling node, a neuron) in the CNN model 1300. In addition, in some embodiments, a storage device (e.g., the storage device 150, the storage 220 of the computing device 200) may be provided for storing data related to the CNN model 1300, such as activations and learned weights for each node.

It should be noted that the example in FIG. 13 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the CNN model 1300 may include one or more additional components. Additionally or alternatively, one or more components of the CNN model 1300 described above may be omitted. As another example, the CNN model 1300 may include any number of layers and nodes.

It will be apparent to those skilled in the art that various changes and modifications can be made in the present disclosure without departing from the spirit and scope of the disclosure. In this manner, the present disclosure may be intended to include such modifications and variations if the modifications and variations of the present disclosure are within the scope of the appended claims and the equivalents thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., ±1%, ±5%, ±10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable. In some embodiments, a classification condition used in classification is provided for illustration purposes and modified according to different situations. For example, a classification condition that "a probability value is greater than the threshold value" may further include or exclude a condition that "the probability value is equal to the threshold value".

What is claimed is:

1. A region of interest (ROI) detection system, comprising:
    at least one storage device including a set of instructions; and
    at least one processor configured to communicate with the at least one storage device, wherein when executing the set of instructions, the at least one processor is configured to direct the system to perform operations including:
    acquiring a target image and an ROI detection model; and
    performing ROI detection on the target image by applying the ROI detection model to the target image, wherein:
        the ROI detection model is a trained cascaded neural network including a plurality of sequentially connected trained models,
        the plurality of trained models include a trained first model and at least one trained second model downstream to the trained first model in the trained cascaded neural network,
        the plurality of trained models are sequentially trained,
        each of the trained second model is trained using a plurality of training samples determined based on one or more trained models of the plurality of trained models generated before the generation of the trained second model, and
        at least one trained model of the plurality of trained models comprises a multi-scale trained model configured to perform ROI detection at a plurality of resolution levels,
        the multi-scale trained model comprises a plurality of sequentially connected layers each of which corresponds to one of the plurality of resolution levels, the plurality of layers including a first layer, a last layer, and one or more middle layers between the first layer and the last layer,
        at least one layer of the plurality of layers other than the last layer is connected to a next layer via a downsampling path, and
        at least one layer of the plurality of layers other than the first layer is connected to a previous layer via an upsampling path.

2. The system of claim 1, wherein:
each of the plurality of trained models is configured to generate an output in response to an input of the trained model,
the input to the trained first model includes the target image,
the input to each of the at least one trained second model includes an output of a previous trained model connected to the trained second model, and
to perform an ROI detection on the target image by applying the ROI detection model to the target image, the at least one processor is further configured to direct the system to perform additional operations including:
 obtaining an output of a last trained model of the plurality of trained models; and
 determining, based on the output of the last trained model, one or more ROIs in the target image.

3. The system of claim 1, wherein:
each of the plurality of trained models is configured to generate an output in response to an input of the trained model,
the input to each trained model includes the target image, and
to perform an ROI detection on the target image by applying the ROI detection model to the target image, the at least one processor is further configured to direct the system to perform additional operations including:
 obtaining an output of each of the plurality of trained models; and
 determining, based on the outputs of the plurality of trained models, one or more ROIs in the target image.

4. The system of claim 3, wherein:
the target image includes a plurality of target pixels,
the output of each trained model includes a first preliminary probability map, and
to determine one or more ROIs in the target image based on the outputs of the plurality of trained models, the at least one processor is further configured to direct the system to perform additional operations including:
 determining, based on the first preliminary probability maps, a first target probability map; and
 determining, based on the first target probability map, the one or more ROIs of the target image.

5. The system of claim 3, wherein:
the target image includes a plurality of target pixels, each of the target pixels having a plurality of target anchor boxes, each of the target anchor boxes enclosing the target pixel and representing a candidate ROI enclosing the target pixel;
the output of each trained model includes a second preliminary probability map and a target regression map, and
to determine one or more ROIs in the target image based on the outputs of the plurality of trained models, the at least one processor is further configured to direct the system to perform additional operations including:
 determining, based on the second preliminary probability maps of the plurality of trained models, a second target probability map;
 determining, based on the target regression map of a last trained model of the plurality of trained models and the second target probability map, a plurality of preliminary ROIs of the target image; and
 determining, based on the plurality of preliminary ROIs, the one or more ROIs of the target image.

6. The system of claim 5, wherein to determine the one or more ROIs of the target image based on the plurality of preliminary ROIs, the at least one processor is further configured to direct the system to perform additional operations including:
 determining the one or more ROIs of the target image by performing a non-maximum suppressing on the plurality of preliminary ROIs.

7. A system for generating a region of interest (ROI) detection model, comprising:
at least one storage device including a set of instructions; and
at least one processor configured to communicate with the at least one storage device, wherein when executing the set of instructions, the at least one processor is configured to direct the system to perform operations including:
 acquiring a plurality of training images, each of the plurality of training images being annotated with one or more ROIs; and
 generating an ROI detection model by training a cascaded neural network using the plurality of training images, the cascaded neural network including a plurality of sequentially connected models, wherein:
  the plurality of models include a first model and at least one second model downstream to the first model in the cascaded neural network,
  the training the cascaded neural network comprises sequentially training the plurality of models,
  the training each of the plurality of models comprises:
   determining, based at least in part on the plurality of training images, a plurality of training samples of the model; and
   generating a trained model by training the model using the plurality of training samples of the model, wherein the plurality of training samples of each of the at least one second model are determined further based on one or more trained models generated before the training of the second model, and
  at least one model of the plurality of models comprises a multi-scale model configured to perform ROI detection at a plurality of resolution levels,
  the multi-scale model comprises a plurality of sequentially connected layers, the plurality of layers including a first layer, a last layer, and one or more middle layers between the first layer and the last layer,
  at least one layer of the plurality of layers other than the last layer is connected to a next layer via a down-sampling path, and
  at least one layer of the plurality of layers other than the first layer is connected to a previous layer via an upsampling path.

8. The system of claim 7, wherein the determining a plurality of training samples of the first model comprises:
 determining, based on the plurality of training images, a plurality of first negative samples of the first model and a plurality of positive samples, each of the plurality of first negative samples being indicative of at least a portion of a non-ROI in the plurality of training images, each of the plurality of positive samples being indicative of at least a portion of the ROIs in the plurality of training images; and
 designating the plurality of first negative samples and the plurality of positive samples as the training samples of the first model.

9. The system of claim 8, wherein the determining a plurality of first negative samples of the first model and a plurality of positive samples comprises:
    designating a plurality of pixels in the ROIs as the plurality of positive samples; and
    designating a plurality of pixels outside the ROIs as the plurality of first negative samples.

10. The system of claim 8, wherein the determining a plurality of first negative samples of the first model and a plurality of positive samples comprises:
    for each of a plurality of pixels in the plurality of training images, defining one or more anchor boxes enclosing the pixel, each of the one or more anchor boxes representing a candidate ROI enclosing the pixel;
    comparing the anchor boxes with the ROIs of the plurality of training images to generate a comparison result; and
    determining, among the anchor boxes based on the comparison result, the plurality of first negative samples and the plurality of positive samples.

11. The system of claim 8, wherein a ratio of a count of the plurality of positive samples to a count of the plurality of first negative samples is equal to or greater than a threshold ratio, the threshold ratio being equal to 0.2.

12. The system of claim 8, wherein the determining the training samples for each of the at least one second model comprises:
    for each of the at least one second model,
        determining a plurality of predicted positive samples representing a plurality of predicted ROIs in the plurality of training images by applying the one or more trained models generated before the training of the second model to the plurality of training images;
        identifying, among the plurality of predicted positive samples, one or more false positive samples;
        determining a plurality of second negative samples of the second model, the plurality of second negative samples including at least a portion of the one or more false positive samples; and
        designating the plurality of second negative samples and the plurality of positive samples as the training samples of the second model.

13. The system of claim 7, wherein the training each of the plurality of models further comprises:
    for each of the at least one second model,
        determining whether a termination condition is satisfied; and
        upon a determination that the termination condition is satisfied, designating a trained cascaded neural network as the ROI detection model, the trained cascaded neural network including the trained second model and the one or more trained models generated before the training of the second model.

14. The system of claim 7, wherein at least one of the one or more middle layers comprises a first block, a second block, and a connection component connecting the first block and the second block.

15. The system of claim 7, wherein the ROI detection model is configured to perform lesion detection on a target image.

16. A non-transitory computer-readable storage medium including instructions that, when accessed by at least one processor of a region of interest (ROI) detection system, causes the system to perform a method, the method comprising:
    acquiring a target image and an ROI detection model; and
    performing ROI detection on the target image by applying the ROI detection model to the target image, wherein:
        the ROI detection model is a trained cascaded neural network including a plurality of sequentially connected trained models,
        the plurality of trained models include a trained first model and at least one trained second model downstream to the trained first model in the trained cascaded neural network,
        the plurality of trained models are sequentially trained,
        each of the trained second model is trained using a plurality of training samples determined based on one or more trained models of the plurality of trained models generated before the generation of the trained second model, and
        at least one trained model of the plurality of trained models comprises a multi-scale trained model configured to perform ROI detection at a plurality of resolution levels,
        the multi-scale trained model comprises a plurality of sequentially connected layers each of which corresponds to one of the plurality of resolution levels, the plurality of layers including a first layer, a last layer, and one or more middle layers between the first layer and the last layer,
        at least one layer of the plurality of layers other than the last layer is connected to a next layer via a downsampling path, and
        at least one layer of the plurality of layers other than the first layer is connected to a previous layer via an upsampling path.

17. The non-transitory computer-readable storage medium of claim 16, wherein each of the plurality of trained models is configured to generate an output in response to an input of the trained model,
    the input to the trained first model includes the target image,
    the input to each of the at least one trained second model includes an output of a previous trained model connected to the trained second model, and
    the performing ROI detection on the target image by applying the ROI detection model to the target image comprises:
        obtaining an output of a last trained model of the plurality of trained models; and
        determining, based on the output of the last trained model, one or more ROIs in the target image.

18. The non-transitory computer-readable storage medium of claim 16, wherein each of the plurality of trained models is configured to generate an output in response to an input of the trained model,
    the input to each trained model includes the target image, and
    the performing ROI detection on the target image by applying the ROI detection model to the target image comprises:
        obtaining an output of each of the plurality of trained models; and
        determining, based on the outputs of the plurality of trained models, one or more ROIs in the target image.

19. The non-transitory computer-readable storage medium of claim 18, wherein the target image includes a plurality of target pixels,
    the output of each trained model includes a first preliminary probability map, and
    the determining one or more ROIs in the target image based on the outputs of the plurality of trained models comprises:

determining, based on the first preliminary probability maps, a first target probability map; and determining, based on the first target probability map, the one or more ROIs of the target image.

20. The non-transitory computer-readable storage medium of claim 18, wherein the target image includes a plurality of target pixels, each of the target pixels having a plurality of target anchor boxes, each of the target anchor boxes enclosing the target pixel and representing a candidate ROI enclosing the target pixel;

the output of each trained model includes a second preliminary probability map and a target regression map, and the determining one or more ROIs in the target image based on the outputs of the plurality of trained models comprises:

determining, based on the second preliminary probability maps of the plurality of trained models, a second target probability map;

determining, based on the target regression map of a last trained model of the plurality of trained models and the second target probability map, a plurality of preliminary ROIs of the target image; and determining, based on the plurality of preliminary ROIs, the one or more ROIs of the target image.

\* \* \* \* \*